(12) United States Patent
Shani et al.

(10) Patent No.: US 11,126,926 B1
(45) Date of Patent: Sep. 21, 2021

(54) CONCURRENT RESULTS PROCESSING IN A QUANTUM CONTROL SYSTEM

(71) Applicant: Quantum Machines, Tel Aviv (IL)

(72) Inventors: Tal Shani, Tel Aviv (IL); Yonatan Cohen, Tel Aviv (IL); Nissim Ofek, Tel Aviv (IL); Itamar Sivan, Tel Aviv (IL)

(73) Assignee: Quantum Machines

( * ) Notice: Subject to any disclaimer, the term of this patent is extended or adjusted under 35 U.S.C. 154(b) by 0 days.

(21) Appl. No.: 16/812,903

(22) Filed: Mar. 9, 2020

(51) Int. Cl.
*G06N 10/00* (2019.01)
*G06F 12/02* (2006.01)
*G06F 15/16* (2006.01)

(52) U.S. Cl.
CPC ......... *G06N 10/00* (2019.01); *G06F 12/0238* (2013.01); *G06F 15/16* (2013.01)

(58) Field of Classification Search
CPC ...... G06N 10/00; G06F 12/0238; G06F 15/16
See application file for complete search history.

(56) References Cited

U.S. PATENT DOCUMENTS

| | | | |
|---|---|---|---|
| 5,194,907 A * | 3/1993 | Hayashi | G01S 7/486 342/125 |
| 7,627,126 B1 | 12/2009 | Pikalo | |
| 8,315,969 B2 | 11/2012 | Roetteler | |
| 8,385,878 B2 | 2/2013 | Rao | |
| 9,207,672 B2 | 12/2015 | Williams | |
| 9,400,499 B2 | 7/2016 | Williams | |
| 9,692,423 B2 | 6/2017 | McDermott, III | |
| 9,847,121 B2 | 12/2017 | Frank | |
| 9,858,531 B1 | 1/2018 | Monroe | |
| 9,892,365 B2 | 2/2018 | Rigetti | |
| 9,978,020 B1 | 5/2018 | Gambetta | |
| 9,979,400 B1 | 5/2018 | Sete | |
| 9,996,801 B2 | 6/2018 | Shim | |
| 10,063,228 B2 | 8/2018 | Deurloo et al. | |
| 10,122,351 B1 | 11/2018 | Naaman | |
| 10,127,499 B1 | 11/2018 | Rigetti | |
| 10,192,168 B2 | 1/2019 | Rigetti | |

(Continued)

FOREIGN PATENT DOCUMENTS

| | | |
|---|---|---|
| CN | 105912070 A | 8/2016 |
| CN | 108111306 A | 6/2018 |

(Continued)

OTHER PUBLICATIONS

Fu et al., "A Microarchitecture for a Superconducting Quantum Processor," in 38.3 IEEE Micro 40-47 (2018). (Year: 2018).*

(Continued)

*Primary Examiner* — Kamran Afshar
*Assistant Examiner* — Ryan C Vaughn
(74) *Attorney, Agent, or Firm* — McAndrews, Held & Malloy, Ltd.

(57) ABSTRACT

Circuitry of a pulse generation program compiler is operable to parse pulse generation program source code comprising a declaration of a non-stream variable, a declaration of a stream variable, and one or more stream processing statements that reference the stream variable. The circuitry of the pulse generation program compiler is operable to generate, based on the declaration of the non-stream variable, a machine for execution by a quantum controller and a quantum orchestration server.

27 Claims, 12 Drawing Sheets

(56) References Cited

U.S. PATENT DOCUMENTS

| | | |
|---|---|---|
| 10,333,503 B1 | 6/2019 | Cohen et al. |
| 10,454,459 B1 | 10/2019 | Cohen |
| 10,505,524 B1 | 12/2019 | Cohen |
| 10,560,076 B1 | 2/2020 | Cohen |
| 10,637,449 B1 | 4/2020 | Cohen et al. |
| 10,659,018 B1 | 5/2020 | Cohen |
| 10,666,238 B1 | 5/2020 | Cohen |
| 2002/0004876 A1* | 1/2002 | Timmer ............ G06F 12/0848 711/3 |
| 2005/0015422 A1* | 1/2005 | Kohn ................. G06N 10/00 708/446 |
| 2016/0267032 A1 | 9/2016 | Rigetti et al. |
| 2016/0292586 A1 | 10/2016 | Rigetti et al. |
| 2017/0214410 A1 | 7/2017 | Hincks et al. |
| 2017/0364796 A1 | 12/2017 | Wiebe |
| 2018/0032893 A1 | 2/2018 | Epstein |
| 2018/0123597 A1 | 5/2018 | Sete |
| 2018/0260245 A1 | 9/2018 | Smith |
| 2018/0260730 A1 | 9/2018 | Reagor |
| 2018/0260732 A1 | 9/2018 | Bloom |
| 2018/0308007 A1 | 10/2018 | Amin |
| 2018/0322409 A1 | 11/2018 | Barends |
| 2018/0365585 A1 | 12/2018 | Smith |
| 2019/0042965 A1 | 2/2019 | Clarke |
| 2019/0042970 A1 | 2/2019 | Zou |
| 2019/0042972 A1 | 2/2019 | Zou |
| 2019/0042973 A1 | 2/2019 | Zou |
| 2019/0049495 A1 | 2/2019 | Ofek |
| 2019/0317589 A1* | 10/2019 | Mathur ................ G06F 1/3228 |
| 2020/0242207 A1* | 7/2020 | Shehab ................ G06F 30/30 |

FOREIGN PATENT DOCUMENTS

| | | |
|---|---|---|
| CN | 110085094 A | 8/2019 |
| WO | 2017139683 A1 | 8/2017 |

OTHER PUBLICATIONS

Mintz et al., "QCOR: A Language Extension Specification for the Heterogeneous Quantum-Classical Model of Computation," in arXiv preprint arXiv:1909.02457 (2019). (Year: 2019).*

Bergholm et al., "PennyLane: Automatic Differentiation of Hybrid Quantum-Classical Computations," in arXiv preprint arXiv: 1811.04968 (2018). (Year: 2018).*

Butko et al., "Understanding Quantum Control Processor Capabilities and Limitations through Circuit Characterization," in arXiv preprint arXiv:1909.11719 (2019). (Year: 2019).*

Breitfelder et al. eds., IEEE 100: The Authoritative Dictionary of IEEE Standards Terms 1247, definition 2 of "variable" (7th ed. 2000). (Year: 2000).*

Int'l Search Report and Written Opinion Appln No. PCT/IB2019/001410 dated Jun. 10, 2020.

U.S. Appl. No. 62/294,966, filed Feb. 12, 2016.

Int'l Search Report and Written Opinion Appln No. PCT/IB2019/001394 dated Jun. 17, 2020.

Zhang J, Hegde SS, Suter D. Pulse sequences for controlled 2- and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

* cited by examiner

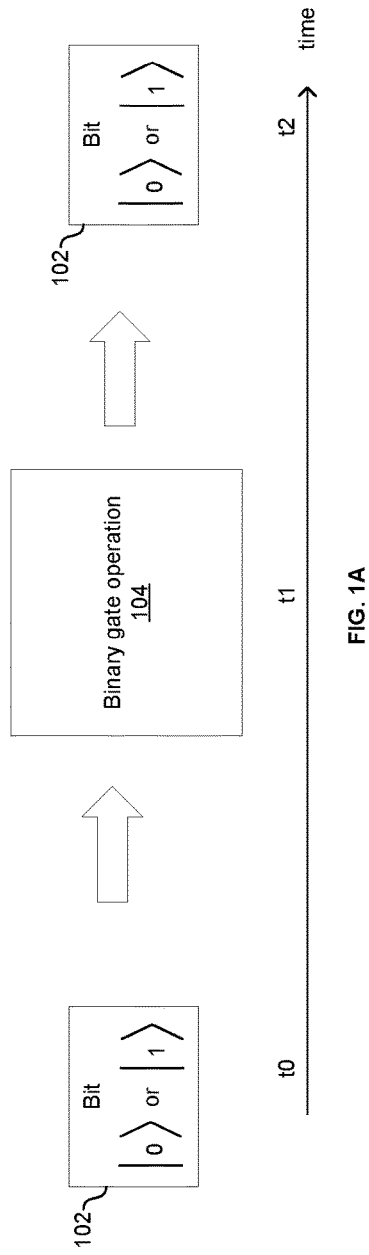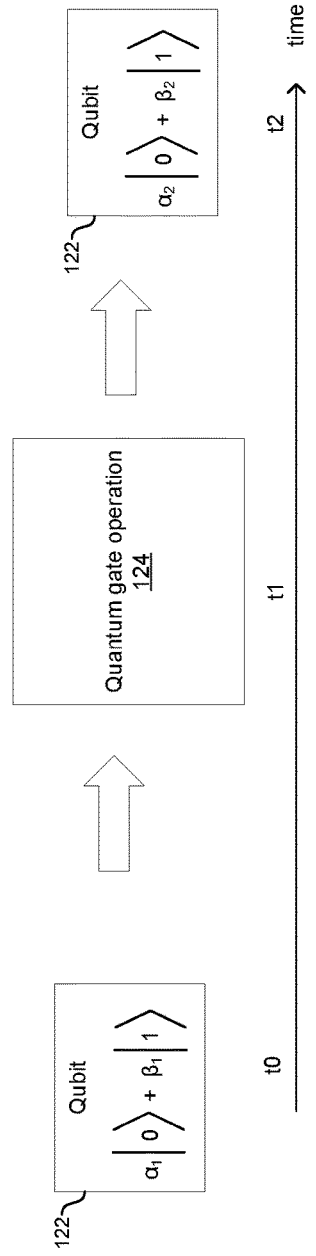

```
config = {
  'version': 1,

'controllers': {
    'con1': {
      'type': 'opx1',
      'analog': {
        1: {'offset': 0.032},
        2: {'offset': 0.041},
        3: {'offset': -0.024},
        4: {'offset': 0.115},
      }
    }
  }, 'elements': {
    'qubit': {
      'mixInputs': {
        'I': ('con1', 1),
        'Q': ('con1', 2),
        'lo_frequency': 5.10e9,
        'mixer': 'mixer_qubit'
      },
      'frequency': 5.15e9,
      'operations': {
        'gauss_pulse': 'gauss_pulse_in'
      },
    },
    'RR': {
      'mixInputs': {
        'I': ('con1', 3),
        'Q': ('con1', 4),
        'lo_frequency': 6.00e9,
        'mixer': 'mixer_res'
      },
      'frequency': 6.12e9,
      'operations': {
        'meas_pulse': 'meas_pulse_in',
      },
      'time_of_flight': 180,
      'smearing': 0,
      'outputs': {
        'out1': ('con1', 1)
      }
    },
  },
```

(continued from FIG. 5A)
○
○
○

```
'pulses': {
  'meas_pulse_in': {
    'operation': 'measurement',
    'length': 200,
    'waveforms': {
       'I': 'exc_wf',
       'Q': 'zero_wf'
    },
    'integration_weights': {
       'integW1': 'integW1',
       'integW2': 'integW2',
    },
    'digital_marker': 'marker1'
  },
  'gauss_pulse_in': {
    'operation': 'control',
    'length': 20,
    'waveforms': {
       'I': 'gauss_wf',
       'Q': 'zero_wf'
    },
  }
}, 'waveforms': {
  'zero_wf': {
    'type': 'constant',
    'sample': 0.0
  },
  'gauss_wf': {
    'type': 'arbitrary',
    'samples':
[0.005387955348880817,  0.01321923408389493,
    0.02935482212631 6085, 0.05899883936462147,
    0.10732436763802927, 0.1767030571463228,
    0.2633180579359862, 0.35514694106994277,
    0.4335372000145 3067, 0.479, 0.479,
    0.4335372000145308, 0.355146941069942 9,
    0.2633180579359 8645, 0.17670305714632292,
    0.10732436763802936, 0.058998839 36462152,
    0.02935482212631 6085, 0.01321923408389493,
    0.005387955348880817]
  }
},
```

(continued from FIG. 5B)
○
○
○

```
'digital_waveforms': {
    'marker1': {
        'samples': [(1, 4), (0, 2), (1, 1), (1, 0)]
    }
}, 'integration_weights': {
    'integW1': {
        'cosine': [4.0, 4.0, 4.0, 4.0, 4.0, 4.0, 4.0,
                4.0, 4.0, 4.0, 4.0, 4.0, 4.0, 4.0,
                4.0, 4.0, 4.0, 4.0, 4.0, 4.0, 4.0,
                4.0, 4.0, 4.0, 4.0, 4.0, 4.0],
        'sine': [0.0, 0.0, 0.0, 0.0, 0.0, 0.0, 0.0,
                0.0, 0.0, 0.0, 0.0, 0.0, 0.0, 0.0,
                0.0, 0.0, 0.0, 0.0, 0.0, 0.0, 0.0,
                0.0, 0.0, 0.0, 0.0, 0.0, 0.0]
    },
    'integW2': {
        'cosine': [0.0, 0.0, 0.0, 0.0, 0.0, 0.0, 0.0,
                0.0, 0.0, 0.0, 0.0, 0.0, 0.0, 0.0,
                0.0, 0.0, 0.0, 0.0, 0.0, 0.0, 0.0,
                0.0, 0.0, 0.0, 0.0, 0.0, 0.0],
        'sine': [4.0, 4.0, 4.0, 4.0, 4.0, 4.0, 4.0,
                4.0, 4.0, 4.0, 4.0, 4.0, 4.0, 4.0,
                4.0, 4.0, 4.0, 4.0, 4.0, 4.0, 4.0,
                4.0, 4.0, 4.0, 4.0, 4.0, 4.0]
    }
}, 'mixers': {
    'mixer_res': [
        {'freq': 6.12e9, 'lo_freq': 6.00e9, 'correction': [1.0, 0.0, 0.0, 1.0]}
    ],
    'mixer_qubit': [
        {'freq': 5.15e9, 'lo_freq': 5.10e9, 'correction': [1.0, 0.0, 0.0, 1.0]}
    ]
}
}
```

FIG. 5C

CONCURRENT RESULTS PROCESSING IN A QUANTUM CONTROL SYSTEM

BACKGROUND

Limitations and disadvantages of conventional approaches to quantum control systems will become apparent to one of skill in the art, through comparison of such approaches with some aspects of the present method and system set forth in the remainder of this disclosure with reference to the drawings.

BRIEF SUMMARY

Methods and systems are provided for concurrent results processing in a quantum control system, substantially as illustrated by and/or described in connection with at least one of the figures, as set forth more completely in the claims.

BRIEF DESCRIPTION OF THE DRAWINGS

FIGS. 1A and 1B compare some aspects of classical (binary) computing and quantum computing.

FIGS. 5A-5C show an example quantum machine specification.

DETAILED DESCRIPTION

Figure 2A:
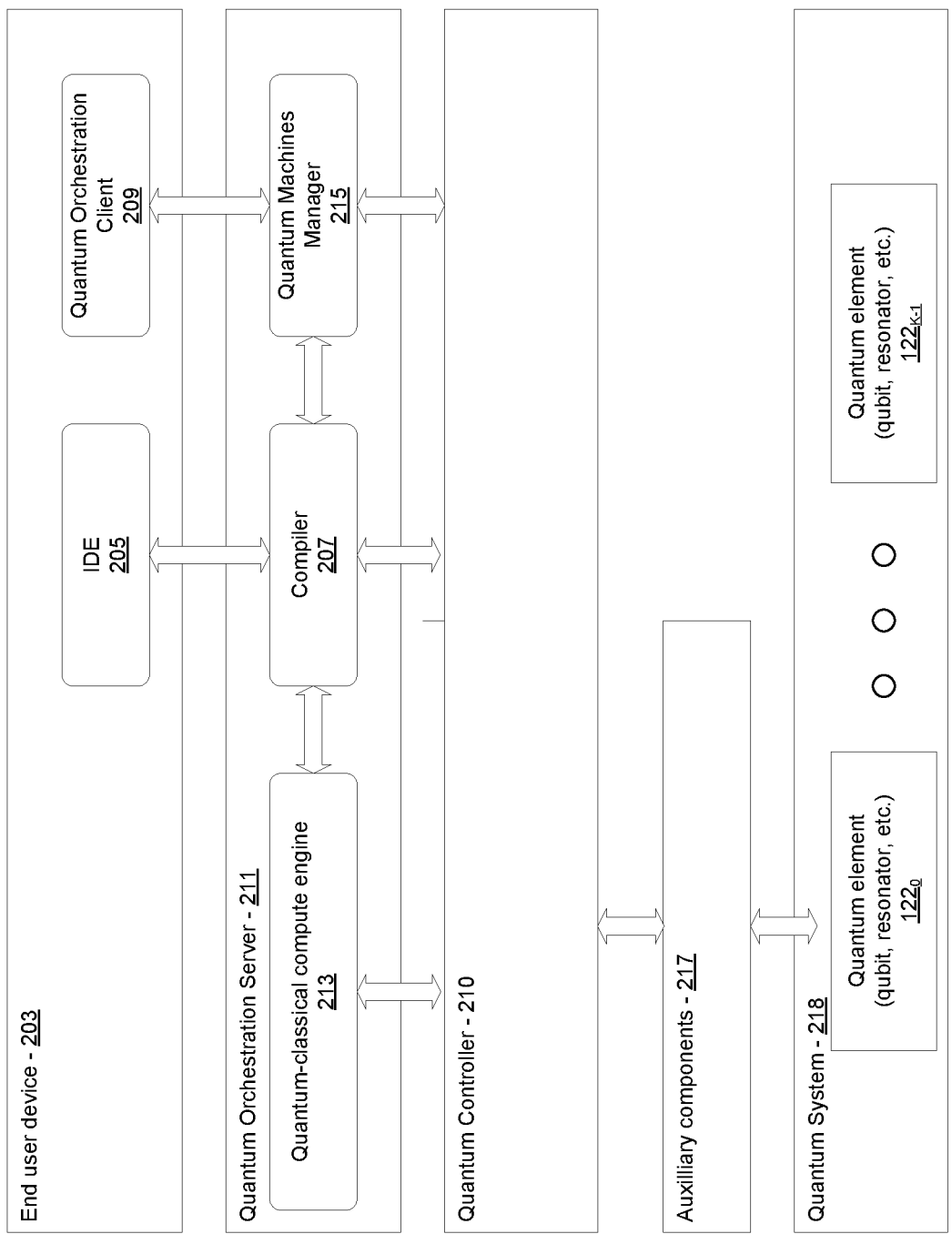
FIG. 2A shows an example quantum orchestration platform.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Shown in FIG. 1A is a simple example of a classical computer configured to a bit 102 and apply a single logic operation 104 to the bit 102. At time t0 the bit 102 is in a first state, at time t1 the logic operation 104 is applied to the bit 102, and at time t2 the bit 102 is in a second state determined by the state at time t0 and the logic operation. So, for example, the bit 102 may typically be stored as a voltage (e.g., 1 Vdc for a "1" or 0 Vdc for a "0") which is applied to an input of the logic operation 104 (comprised of one or more transistors). The output of the logic gate is then either 1 Vdc or 0 Vdc, depending on the logic operation performed.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle+\beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2 \cdot |0\rangle$ and $|1\rangle$ can also be represented by two-dimensional basis vectors $$\begin{bmatrix} 1 \\ 0 \end{bmatrix} \text{ and } \begin{bmatrix} 0 \\ 1 \end{bmatrix},$$

respectively, and then the qubit state is represented by $$\begin{bmatrix} \alpha \\ \beta \end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers (in fact, some problems that are intractable for classical computers may become trivial for quantum computers).

Shown in FIG. 1B is a simple example of a quantum computer configured to store a qubit 122 and apply a single quantum gate operation 124 to the qubit 122. At time t0 the qubit 122 is described by $\alpha_1|0\rangle+\beta_1|1\rangle$, at time t1 the logic operation 104 is applied to the qubit 122, and at time t2 the qubits 122 is described by $\alpha_2|0\rangle+\beta_2|1\rangle$.

Unlike a classical bit, a qubit cannot be stored as a single voltage value on a wire. Instead, a qubit is physically realized using a two-level quantum mechanical system. Many physical implementations of qubits have been proposed and developed over the years with some being more promising than others. Some examples of leading qubits implementations include superconducting circuits, spin qubits, and trapped ions.

It is the job of the quantum controller to generate the precise series of external signals, usually pulses of electromagnetic waves and pulses of base band voltage, to perform the desired logic operations (and thus carry out the desired quantum algorithm). Example implementations of a quantum controller are described in further detail below.

FIG. 2A shows an example quantum orchestration platform (QOP). The system comprises a end-user device 203, a quantum orchestration server 211, a quantum controller 210, auxiliary components 217, and a quantum system 218.

The end-user device 203 is configured (via hardware, firmware, and/or software) to operate as: an integrated development environment (IDE) 205 and a quantum orchestration client 209.

The Quantum orchestration client 209 is operable to interact with the quantum orchestration server 211 to configure and interact with one or more "quantum machines" comprised of resources of the quantum orchestration server 211, the quantum controller 210, the auxiliary components 217, and the quantum system 218. In an example implementation, the interactions are via a quantum machine application programming interface (QM API) and a quantum machine manager API (QMM API).

The pulse generation program IDE 205 provides a graphical user interface for a user to write and debug pulse generation programs (sometimes referred to here by the trade name of "QUA" programs) as well as quantum machine specifications used by the pulse generation programs. In an example implementation, a "QUA" programming language is used to write the specification and pulse generation program. In one implementation of QUA, PYTHON™ is used as a "host" language for the pulse generation program and quantum machine specification. This allows leveraging PYTHON™ syntax/constructs (PYTHON™ variables, functions, etc.) to perform linting, code completion, etc. But the pulse program is still a QUA—not PYTHON™—program to be compiled by the QUA compiler 207, which generate QOP machine code to be executed on the quantum controller 210 and the quantum orchestration server 211. A QOP programmer can use the IDE 205 to generate a quantum machine specification and a pulse program. The specification and program may be part of one or more larger databases and/or contained in one or more files (e.g., each may take the form of a plain-text file recognizable by an operating system such as WINDOWS®, LINUX®, Mac, or another OS). The program and specification are then conveyed to the compiler 207 of the quantum orchestration server 211.

The quantum orchestration server 211 is configured (via hardware, firmware, and/or software) to operate as a quantum-classical compute engine 213, compiler 207, and as a quantum machines manager 215.

The quantum machines manager 215 comprises circuitry operable to determine resources present in the quantum controller 210, auxiliary components 217, and quantum system 218 and the availability of those resources at any given time. To determine the resources, the quantum machines manager 215 may be operable to read one or more configuration registers of the quantum controller 210, inspect a netlist of one or more circuits of the quantum controller 210, and/or parse hardware description language (HDL) source code used to define circuits of the quantum controller 210 and/or other files used to describe various configurations of the hardware and software components. Once the resources are determined, the quantum machines manager 215 may keep track of which resources are in use and which are available based on which quantum machines are "open" (i.e., in a state where some resources are reserved for that machine regardless of which, if any, pulse program that quantum machine is executing at that time), and/or which pulse programs are loaded into and/or being executed by the quantum controller 210 at that time.

The quantum-classical compute engine 213 comprises circuitry operable to perform classical processing operations on data streams output by the quantum controller 210. As further described below, the processing may occur in real-time during execution of a pulse program. The results of such processing may be used to set values of memory locations referenced by variables defined in the pulse program. The pulse program may then react to the changes in these values (e.g., the values may be referenced by variables that are part of the condition expression in conditional statements such as IF-ELSE statements, FOR and WHILE loops, etc.). For example, a pulse program may comprise a conditional expression that depends on a variable 'x' and variable 'x' may reference the result of a computationally intensive expression that in turn depends on the current state of one or more qubits. Accordingly, the state of the qubits may be streamed to the quantum classical compute engine 213, which performs the expression to determine the value referenced by 'x,' and then passes the value referenced by x back to the quantum controller 210 which evaluates the conditional expression based on the new value referenced by 'x' and then continues execution of the pulse program. The results of the stream processing performed by the quantum-classical compute engine 213 may also be concurrently streamed to the end-user device (e.g., for the user to monitor the in-progress pulse program).

Figure 2B:
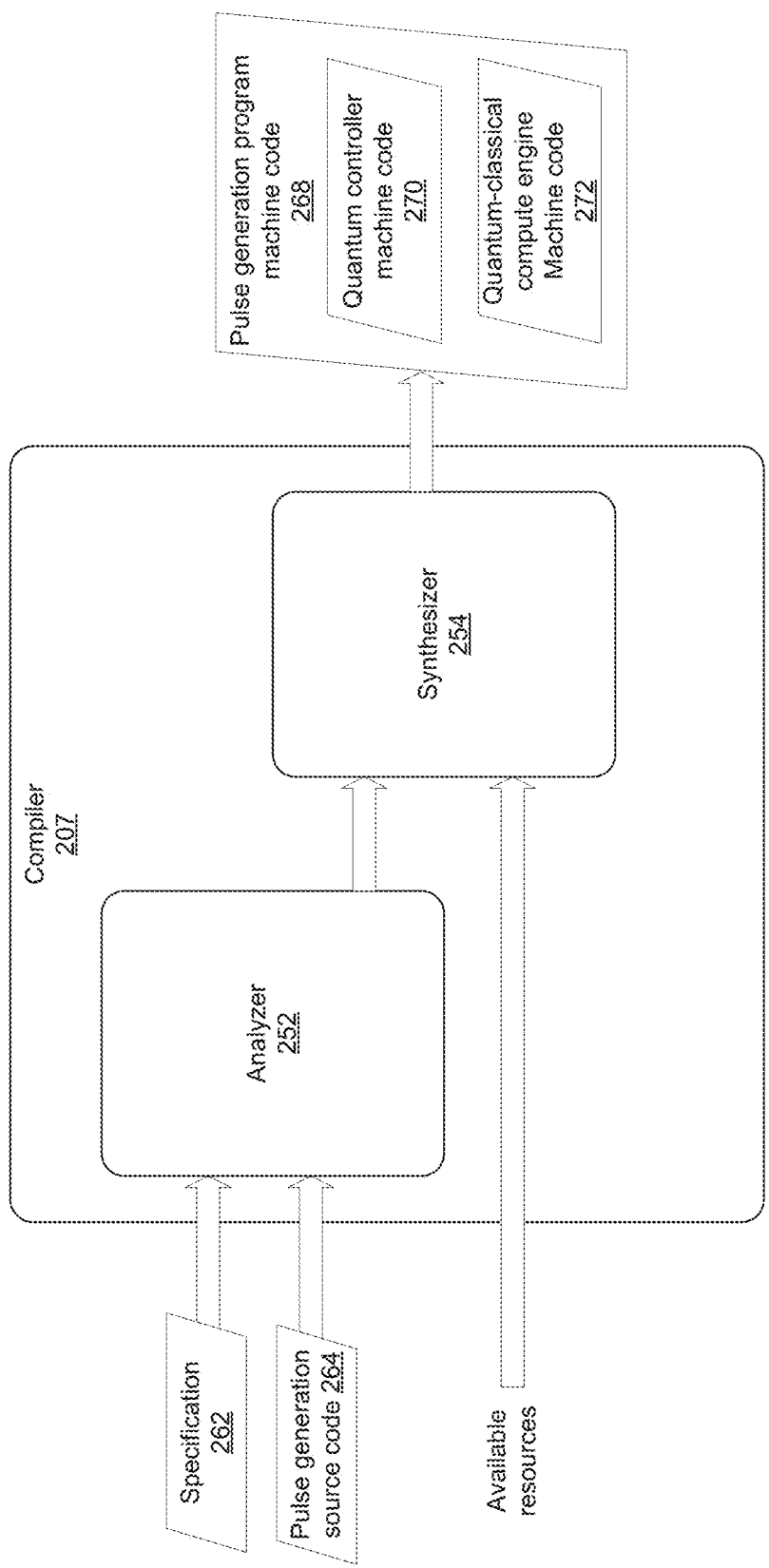
FIG. 2B illustrates an example implementation of a pulse generation program compiler.

Referring to FIG. 2B, the compiler 207 comprises circuitry operable to generate machine code 268 (i.e., series of binary vectors 270 that represent instructions that hardware of the quantum controller 210 can execute and a series of binary vectors 272 that represent instructions that hardware of the quantum orchestration server 211 can execute) from (1) a specification 262 (received from end-user device_203); (2) pulse generation source code 264 (received from end-user device_203); and (3) a resources management data structure (received from the quantum machines manager 215).

The compiler 207 comprises analyzer circuitry 252 and synthesizer circuitry 254. The analyzer circuitry 252 is operable to parse the specification 262 and source code 264 to generate an intermediate code representation (e.g., a parse tree). The synthesizer circuitry 254 is operable to generate machine code 268 based on the intermediate code representation and the available resources indicated by the quantum machines manager 215.

The specification 262 identifies resources of a quantum machine some of which are mapped to physical circuits during instantiation of a quantum machine (e.g. input and output ports of the quantum controller 210), and some of which the compiler 207 maps to physical circuits of the quantum controller 210 during compilation. The compiler 207 may allocate resources for executing the program 268 based on the specification 262, the source code 264, and/or the available resources indicated by the quantum machines manager 215. As an example, assume a scenario in which there are five quantum elements in the specification 262 but the source code 264 uses only two of the quantum elements; the number of the pulsers $302_0$-$302_L$ allocated may depend on the available resources and the specifics of the source code 264. In one case, the compiler 207 may allocate a first number (e.g., two) of the pulsers $302_0$-$302_L$ for interfacing with the two quantum elements and in another case the compiler may allocate a second number (e.g., four) for sending pulses to the two quantum elements.

Table 1 below shows an example quantum machine specification schema which uses PYTHON™ as a host language.

TABLE 1

| Example quantum machine specification schema | | |
|---|---|---|
| version | | integer <int32> |
| | | schema version. |
| controllers | | object |
| | | A collection of controllers. Each controller represents a control and computation resource on the quantum controller 210 hardware. |
|   property name* | | object (controller) |
| | | specification of a single quantum control module. Here we define its static properties. |
|     analog_outputs | | object |
| | | a collection of analog output ports and the properties associated with them |
|       property name* | | object (quantum control module analog output port) |
| | | specification of the properties of a physical analog output port of the quantum control module. |
|         offset | | number |
| | | DC offset to output, range: (−0.5, 0.5). Will be applied only when program runs. |
|     digital_outputs | | object |
|       property name* | | object (quantum control module digital port) |
| | | specification of the properties of a physical digital output port of the quantum control module. |
|         offset | | number |
|     analog | | object |
| | | a collection of analog output ports and the properties associated with them. |
|       Property name* | | object (quantum control module analog output port) |
| | | specification of the properties of a physical analog output port of the quantum control module. |
|         offset | | number |
| | | DC offset to output, range: (−0.5, 0.5). Will be applied only when program runs. |
|     type | | string |
| | | Default: "opx1" |
|     analog_inputs | | object |
|       Property name* | | object (quantum control module analog input port) |
| | | specification of the properties of a physical digital input port of the quantum control module. |
|         Offset | | number |
| elements | | object |
| | | A collection of quantum elements and/or external devices. Each quantum element represents and describes a controlled entity which is connected to the ports (analog input, analog output and digital outputs) of the quantum control module. |
|   property_name | | object (quantum element (QE)) |
| | | specification of a single element. Here we define to which port of the quantum control module the element is connected, what is the RF frequency of the pulses sent and/or received from this element |
|     frequency | | integer <int32> |
| | | resonance frequency [Hz]. Actual carrier frequency output by the quantum control module to the input of this QE is frequency-lo_frequency. |
|     mixInputs | | object (mixer input) |
| | | specification of the input of a QE which is driven by an IQ mixer |
|       I | | string |
| | | (tuple) of the form ((string) controller name, (int) controller output/input port) |
|       Q | | string |
| | | (tuple) of the form ((string) controller name, (int) controller output/input port) |
|       mixer | | string |
| | | the mixer used to drive the input of the QE, taken from the names in mixers entry in the main quantum machine specification |
|       lo_frequency | | integer <int32> |
| | | the frequency of the local oscillator which drives the mixer |
|     outputs | | object |
| | | collection of up to two output ports of QE. Keys: "out1" and "out2". |
|       property_name* | | string |
| | | (tuple) of the form ((string) controller name, (int) controller output/input port) |
|     intermediate_frequency | | integer <int32> |
| | | intermediate frequency [Hz]. The actual frequency to be output by the quantum control module to the input of this element |

TABLE 1-continued

Example quantum machine specification schema

| | | |
|---|---|---|
| | measurement_qe | String |
| | | A reference to an element that has outputs (and thus can be measured using the measurement command). This can be specified for any element that does not have outputs so that whenever a measurement command is used to measure this element, the actual measurement will be of the referenced element. |
| | smearing | integer <int32> |
| | | padding time, in nsec, to add to both the start and end of the raw data streaming window during a measure command. |
| | time_of_flight | integer <int32> |
| | | delay time [nsec] from start of pulse until output of QE reaches quantum control module. Minimal value: 180. Used in measure command, to determine the delay between the start of a measurement pulse and the beginning of the demodulation and/or raw data streaming window. |
| | singleInput | object (single input) |
| | | specification of the input of a QE which has a single input port |
| |   port | string |
| | | (tuple) of the form ((string) controller name, (int) controller output/input port) |
| | operations | object |
| | | A collection of all pulse names to be used in play and measure commands |
| |   property_name* | string |
| | | the name of the pulse as it appears under the "pulses" entry in the quantum machine specification |
| | digitalInputs | object |
| |   property_name* | object (digital input) |
| | | specification of the digital input of a QE |
| |     port | string |
| | | (tuple) of the form ((string) controller name, (int) controller output/input port) |
| |     delay | integer <int32> |
| | | the digital pulses played to this QE will be delayed by this amount [nsec] relative to the analog pulses. |
| | | An intrinsic negative delay of 143 +− 2 nsec exists by default |
| |     output | string |
| | | (tuple) of the form ((string) controller name, (int) controller output/input port) |
| |     buffer | integer <int32> |
| | | all digital pulses played to this QE will be convolved with a digital pulse of value 1 with this length [nsec] |
| pulses | | object |
| | | A collection of pulses to be played to the quantum elements. In the case of a measurement pulse, the properties related to the measurement are specified as well. |
| | property_name | object (pulse) |
| | | specification of a single pulse. Here we define its analog and digital components, as well as properties related to measurement associated with it. |
| |   integration_weights | object |
| | | if measurement pulse, a collection of integration weights associated with this pulse, |
| | | to be applied to the data output from the QE and sent to the controller. |
| | | Keys: name of integration weights to be used in the measurement command. |
| |     property_name* | string |
| | | the name of the integration weights as it appears under the "integration_weights" entry in the quantum machine specification |
| |   waveforms | object |
| | | a specification of the analog waveform to be played with this pulse. |
| | | If associated element has singleInput, key is "single". |
| | | If associated element has "mixInputs", keys are "I" and "Q". |
| |     property_name* | string |
| | | name of waveform to be played at the input port given in associated keys |
| |   digital_marker | string |
| | | name of the digital marker to be played with this pulse |
| |   operation | string |
| | | type of operation. Possible values: control, measurement |
| |   length | integer <int32> |
| | | length of pulse [nsec]. Possible values: 16 to 4194304 in steps of 4 |

TABLE 1-continued

Example quantum machine specification schema

| | |
|---|---|
| waveforms | object |
| | A collection of analog waveforms to be output when a pulse is |
| | played. Here we specify their defining type (constant, arbitrary |
| | or compressed) and their actual datapoints. |
| property_name* | arbitrary waveform (object) or constant wave (object) or |
| | compressed waveform (object) |
| type | 'arbitrary' \| 'constant' \| 'compressed' |
| samples | If type = 'arbitrary': |
| |    Array of numbers <float> |
| |    list of values of arbitrary waveforms, range: (−0.5, 0.5) |
| | If type = 'constant': |
| |    number <float> |
| |    value of constant, range: (−0.5, 0.5) |
| | If type = 'compressed': |
| |    Array of numbers <float> |
| |    Integer <int32> |
| digital_waveforms | object |
| | A collection of digital waveforms to be output when a pulse is |
| | played. Here we specify their actual datapoints. |
| property_name* | object (digital waveform) |
| | raw data samples of a digital waveform |
| samples | Array of strings |
| | (list of tuples) specifying the analog data according to following |
| | code: |
| | The first entry of each tuple is 0 or 1 and corresponds to the |
| | digital value, and the second entry is the length in nsec to play |
| | the value, in steps of 1. If value is 0, the value will be played to |
| | end of pulse. |
| integration_weights | object |
| | A collection of integration weight vectors used in the |
| | demodulation of pulses returned from a quantum element. |
| property_name* | object (integration weights) |
| | specification of a set of measurement integration weights. |
| | Result of integration will be: |
| | sum over i of (W_cosine[i]cos[wt[i]] + |
| | W_sine[i]sin[wt[i]])analog[i]. |
| | Here: |
| | w is the angular frequency of the quantum element, and |
| | analog[i] is the analog data acquired by the controller. |
| | W_cosine, W_sine are the vectors associated with the 'cosine' |
| | and 'sine' keys, respectively. |
| | Note: the entries in the vector are specified in 4 nsec intervals, |
| | and each entry is repeated four times during the |
| | demodulation. |
| | Example: |
| | W_cosine = [2.0], W_sine = [0.0] will lead to the following |
| | demodulation operation: |
| | 2.0(cos[wt[0]]analog[0] + cos[wt[1]]analog[1] + |
| | cos[wt[2]]analog[2] + cos[wt[3]]analog[3]) |
| sine | Array of numbers <float> |
| | W_sine, a fixed-point vector of integration weights, |
| | range: [−2048, 2048] in steps of 2**-15 |
| cosine | Array of numbers <float> |
| | W_cosine, a fixed-point vector of integration weights, |
| | range: [−2048, 2048] in steps of 2**-15 |
| mixers | object |
| | A collection of IO mixer calibration properties, used to post- |
| | shape the pulse to compensate for imperfections in the mixers |
| | used for upconverting the analog waveforms. |
| property_name* | Array of objects (mixer) |
| intermediate_frequency | integer <int32> |
| | intermediate frequency associated with correction matrix |
| lo_freq | integer <int32> |
| | local oscillator (LO) frequency associated with correction |
| | matrix |
| correction | string |
| | (tuple) a 2 × 2 matrix entered as a four-element tuple specifying |
| | the correction matrix |

Elements of the quantum system; (e.g. qubits, resonators, flux lines, gates, etc.), external devices (e.g., oscilloscopes, spectrum analyzers, waveform generators, etc.), and/or any other element which is a part of a quantum machine and is connected to output and/or input ports of the controller 210, are defined in the quantum machine specification 262 (which may be used in the example quantum machine specification schema described above in Table 1 and/or other similar properties which may be used in other implementations).

An example of other properties which may be used to specify an element are properties of a neural network that processes pulses sent to the element. For example, an element specification may specify that pulses sent to it are to be generates and/or processed by a neural network and the element definition may include one or more parameters specifying the number of layers of the neural network, the number of neurons of the neural network, the weights and biases for each neuron of the neural network, and/or other parameters familiar to those working with neural networks. The neural network having the specified parameters may then be trained during a calibration routine (e.g., at the beginning of execution of a pulse generation program).

For each element defined in a quantum machine specification 262, the controller 210 output and/or input ports to which it is connected are defined. During compilation, pulse modification settings for manipulating pulses intended for a quantum element may be generated, and the pulse modification setting circuit(s) into which the settings will be loaded may be chosen. Those chosen circuits may then be allocated to the quantum machine on which the program is to be executed. Similarly, parameters and configurations of operations that will be performed on input signals related to an element (e.g. readout/measurement pulses) may be generated during compilation (e.g., for loading into compute and signal processing circuits 410 of the quantum controller 210, and for configuring the quantum-classical compute engine 213 to perform operations specifically needed for the particular pulse generation program). Likewise, during compilation, the compute and signal processing circuit 410 in which they will be used may be chosen and allocated to the quantum machine on which the program is to be executed.

One example of an element that a quantum machine may contain is an IQ mixer that is connected to two output ports of the controller 210, To correct for mixer imbalances, the in-phase/quadrature (IQ) waveforms of the pulse can be multiplied by a 2×2 mixer correction matrix before being sent to the output ports. This mixer correction matrix, determined via a calibration routine, may be frequency dependent. Thus, a mixer definition in the specification 262 may include the mixer's name and a list of one or more frequencies and the correction matrix to be used at each frequency. In one example implementation, the correction matrix is loaded into corresponding pulse modification circuit during compilation. Similarly, an element definition in the specification 262 may include an intermediate frequency with which every pulse sent to the element is to be modulated.

An example quantum machine specification file is described below with reference to FIGS. 5A-5C. While the example implementations shown here (including the one Table 1 refers to) show some possible properties that can be defined and specified in the quantum machine specification, it is not limited to these examples. For example, various filters and their parameters may be defined (e.g. FIR filter) to be performed on pulses to be played to certain elements and/or on input signals to the controller.

Pulses available for transmission by a quantum machine may be defined using one or more of the properties described above in Table 1 and/or other similar properties which may be used in other implementations. Each pulse may have a length. Each pulse may be made of one or more waveforms. In one implementation, there are two types of pulses: control pulse, which are pulses that are only sent to the quantum system and will not be measured; and measurement pulses, which are sent to the quantum system and will be measured upon return. The definition of a measurement pulse may specify parameters to be used for processing the measurement pulse upon its return from the element to which it was sent. Such parameters may include, for example, integration weights, integration method (e.g., normal, chunked, accumulated, moving average, etc.), parameters (e.g., number of layers, number of neurons, weights and biases, and/or the like) of a neural network, parameters (e.g., number of taps and tap coefficients) of a FIR filter, and/or the like. During compilation, pulse definitions may be used to, for example: generate pulse templates to load into pulse template memory 404; generate instructions to be loaded into instruction memory 402, and/or into compute and signal processing circuit 410 for retrieving and manipulating the contents of pulse template memory 404 to achieve the defined pulses; generate one or more classical processor programs to be executed by compute and signal processing circuit 410 for processing readout/measurement pulses; and/or generate one or more classical processor programs to be executed by quantum-classical compute engine 213 for processing data streamed from the quantum controller 210 during and/or after completion of the pulse generation program.

The pulse generation source code 264 comprises statements that define a sequence of operations to be performed by the quantum machine defined in the specification 262. Such operations typically include the generation of one or more analog pulses to be sent to a controlled element, such as a quantum element (e.g., a qubit). Such operations typically include measuring one or more return pulses from an element. Functions, syntax, etc. of an example implementation of the QUA programming language are described below.

In an example implementation, a QUA source code 264 defines the sequence of statements for: (1) Generating, shaping and sending pulses to the quantum device; (2) Measuring of pulses returning from the quantum device; (3) Performing real-time classical calculations on the measured data and storing results in memory locations referenced by classical variables; (4) Performing real-time classical calculations on values referenced by classical variables; (5) Controlling the flow of the program, including branching statements; and (6) Streaming of data from the quantum controller 210 to the quantum orchestration server 211; processing and saving the data it in the quantum orchestration server 211; and/or streaming the data to the end-user device 203.

In addition to the description of which pulses are played, the QUA source code 264 can also specify when they should be played through both explicit and implicit statements and dependency constructs. Thus, QUA source code 264 can define exactly the timing in which pulses are played, down to the single sample level and single clock cycles of the quantum controller 210.

In an example implementation, the pulses syntax defines an implicit pulse dependency, which determines the order of pulse execution. The dependency can be summarized as follows: (1) Each pulse is played immediately, unless dependent on a previous pulse yet to be played; (2) Pulses applied to the same quantum element are dependent on each other according to the order in which they are written in the program. In another implementation, timing and ordering or pulses may be set forth explicitly in the QUA source code.

Example QUA programming constructs are described below in Table 2.

TABLE 2

QUA programming constructs play(pulse * amp($g_{00}$, $g_{01}$, $g_{10}$, $g_{11}$), qe, duration=None, condition=None, break_condition=None)
Play a pulse to an element.
The pulse will be modified according to the properties of the element defined in the specification, and then played to the analog output(s) defined in the specification.
Parameters:
    pulse - name of the pulse, as defined in the quantum machine specification.
    qe - name of the quantum element, as defined in the quantum machine specification.
    duration - duration of the pulse ("=None" means default is no explicit duration)
    $g_{ij}$: - an expression;
    amp( ) - matrix definition;
    condition - if present, the pulse will be played with the condition evaluates to true ("=None"
    means default is no condition);
    break_condition - if present, the pulser will be stopped when the condition evaluates to true
    ("=None" means default is no break_condition);
It is possible to scale the pulse's amplitude dynamically by using the following syntax:
    play('pulse_name' * amp(v), 'element') where amp(v) = mat(v, 0, 0, v) where v is a QUA variable
(i.e., a PYTHON ™ variable that references an object created by a call to declare( ) function).
Moreover, if the pulse is intended for an element that receives a pulse pair and thus is defined with
two waveforms, the two waveforms, described as a column vector, can be multiplied by a matrix:
    play('pulse_name' * amp([v_00, v_01, v_10, v_11]), 'element'),
where v_ij, i,j={0,1}, are QUA variables.
Example:
    >>> with program( ) as prog:
    >>>    v1 = declare(fixed)
    >>>    assign(v1, 0.3)
    >>>    play('pulse1', 'qe1')
    >>>    play('pulse1' * amp(0.5), 'qe1')
    >>>    play('pulse1' * amp(v1), ' qe1')
    >>>    play('pulse1' * amp([0.9, v1, −v1, 0.9]), 'qe_iq_pair')
wait(duration, *qes)
Wait for the given duration on all provided elements.
During the wait command the quantum controller 210 will output 0.0 to the elements.
    Parameters:    duration (int / QUA variable of type int) - time to wait (e.g., in multiples of 4nsec
        with Range: [4, $2^{24}$]in steps of 1).
        *qes (str / sequence of str) - elements to wait on (the asterisk denotes there can be
        0 or more)
wait_for_trigger(element, pulse_to_play)
Wait for an external trigger on the provided element.
During the wait command the quantum controller 210 will output 0.0 to the elements.
    Parameters:    element (str) - element to wait on.
        pulse_to_play (str / None) - the name of the pulse to play on the element while
        waiting for the external trigger. Must be a constant pulse. Can be None to play
        nothing while waiting.
measure(pulse, qe, Rvar, *outputs)
The measure statement allows operating on a quantum element (which has outputs), by
sending a pulse to it, after some time acquiring the returning signal and processing it in
various ways
An element for which a measurement is applied must have outputs defined in the quantum machine
specification.
A measurement may comprise:
    playing a pulse to the element (identical to a play statement)
    waiting for a duration of time defined as the time_of_flight in the definition of the element,
    and then sampling the returning pulse. The analog input to be sampled is defined in the
    definition of the element.
    processing the returned samples using the listed process(es) (if any). The processing could be,
    for example, demodulation and integration with specified integration parameters, which may
    produce a scalar or a vector; filtering by a FIR filter, and/or processing by a neural network.
Parameters
    pulse - name of the pulse, as defined in the quantum machine specification. Pulse must have
    a measurement operation.
    qe - name of the element, as defined in the quantum machine specification. The element must
    have outputs.
    Rvar - a QUA stream variable (i.e., a PYTHON ™ variable that references an object returned by a call
    to the declare_stream( ) function), a string, or 'None'. If Rvar is QUA stream variable, the raw ADC
    data will be sent to the quantum orchestration server 211 for processing according to the
    with_results_processing section of the QUA source code. If Rvar is a string, the raw ADC data will
    be sent to the quantum orchestration server 211 and saved as is with the default minimal TABLE 2-continued QUA programming constructs processing. If Rvar is set to 'None', raw results will not be sent to quantum orchestration server
   211 and will not be saved. In one implementation, the raw results will be saved as long as a digital
   pulse played along with quantum control pulse is high.
   outputs - a tuple with the form (processing identifier, params, variable name), where:
    processing reference
     defined in the top-level specification and/or in reserved words of the QUA language
     and referred to in the pulse definition.
    Params
     parameters passed to the processing reference
    variable name
     the name of a QUA variable that references a memory location to which the processing
     result is to be saved.
   zero or more output tuples may be defined.
Example:
\>>> with program( ) as prog:
\>>> I = declare(fixed)
\>>> Q = declare(fixed)
\>>>
\>>> # measure by playing 'meas_pulse1' to QE 'rr1', do not save raw results.
\>>> # demodulate and integrate using 'cos_weights' and store result in I, and also
\>>> # demodulate and integrate using 'sin_weights' and store result in Q
\>>> measure('meas_pulse1', 'rr1', None, ('int', 'cos_weights', I), ('int' 'sin_weights', Q))
\>>>
\>>> # measure by playing 'meas_pulse2' to QE 'rr1', save raw results to tag 'samples'.
\>>> # demodulate and integrate data from 'out1' port of 'rr1' using the 'optimized_weights'
integration parameters
\>>> # store result in I
\>>> measure('meas_pulse2', 'rr1', 'samples', ('int', 'optimized_weights', 'out1', I))
align(*qes)
   Align several quantum elements together.
   All of the quantum elements referenced in *qes will wait for all the others to finish their
   currently running statement.
   Parameters
    *qes (str / sequence of str) - a single quantum element, or list of quantum elements
pause( )
   Pause the execution of the job until QmJob.resume( ) is called.
   The quantum machines freezes on its current output state.
declare(t)
   Declare a QUA variable to be used in subsequent expressions and assignments.
   Declaration is performed by declaring a PYTHON ™ variable with the return value of this function.
   Parameters
    t - The type of QUA variable. Possible values: int, fixed, bool, where:
     int
      a signed 32-bit number
     fixed
      a signed 4.28 fixed point number
     bool
      either True or False
   Returns
   The variable
   Example:
\>>> a = declare(fixed)
\>>> play('pulse' * amp(a), 'qe')
declare_stream(t)
   Declare a QUA stream variable to be used in subsequent expressions and assignments.
   Declaration is performed by declaring a PYTHON ™ variable with the return value of this function.
   Parameters
    t - The type of QUA variable. Possible values: int, fixed, bool, where:
     int
      a signed 32-bit number
     fixed
      a signed 4.28 fixed point number
     bool
      either True or False
   Returns
    The variable
   Example:
\>>> I = declare(fixed)
\>>> RI = declare_stream(fixed)
. . .
\>>> save(I, RI) //stream the value of I to the quantum orchestration server
assign(var, _exp)
   Set the value of a given QUA variable.
   Parameters
    var (QUA variable) - The variable to set (defined by the declare function)
    _exp (QUA expression) - An expression to set the variable to TABLE 2-continued QUA programming constructs Example:
```
>>> with program( ) as prog:
>>> v1 = declare(fixed)
>>> assign(v1, 1.3)
>>> play('pulse1' * amp(v1), 'qe1')
```
save(var, tag)
    Save a QUA variable with a given tag.
    The tag will appear later as a field in the saved results object returned by QmJob.get_results( ).
    The type of the variable determines the PYTHON ™ type, according to the following rule:
        int -> int
        fixed -> float
        bool -> bool
    Parameters
        var (QUA variable) - A QUA variable to save
        tag (str) - A name to save the value under
update_frequency(qe, new_frequency)
    Dynamically update the frequency of the NCO associated with a given quantum element.
    This changes the frequency from the value defined in the quantum machine specification.
    Parameters
        qe (str) - The quantum element associated with the NCO whose frequency will be
        changed
        new_frequency (int) - The new frequency value to set in units of Hz. Range: (0 to
        5000000) in steps of 1.
    Example:
```
>>> with program( ) as prog:
>>>     update_frequency("q1", 4000000)
```
z_rotation(angle, *qes)
    Shift the phase of the NCO associated with a quantum element by the given angle.
    This is typically used for virtual z-rotations. Equivalent to z_rot( )
    Parameters
        angle (float) - The angle to add to the current phase (in radians)
        *qes (str / sequence of str) - A quantum element, or sequence of quantum elements,
        associated with the NCO whose phase will be shifted
z_rot(angle, *qes)
    Shift the phase of the NCO associated with a quantum element by the given angle.
    This is typically used for virtual z-rotations. Equivalent to z_rotation( )
    Parameters
        angle (float) - The angle to add to the current phase in radians)
        *qes (str / sequence of str) - A quantum element, or sequence of quantum elements,
        associated with the NCO whose phase will be shifted
set_frame(qes, angle)
    Set the phase of the frame matrix associated with a quantum element to the given angle.
reset_phase(qes, angle)
    Set the total phase of the frequency modulation of a quantum element to zero (both the
    frequency modulation matrix and the frame matrix).
infinite_loop_( )
    Infinite loop flow control statement in QUA.
    To be used with a context manager.
    Optimized for zero latency between iterations, provided that no more than a single quantum
    element appears in the loop.
    Note
    In case multiple quantum elements need to be used in an infinite loop, it is possible to add
    several loops in parallel (see example).
    Example:
```
>>> with infinite_loop_( ):
>>>     play('pulse1', 'qe1')
>>> with infinite_loop_( )
>>>     play('pulse2', 'qe2')
```
for(var=None, init=None, cond=None, update=None)
    For loop flow control statement in QUA.
    To be used with a context manager.
    Parameters
        var (QUA variable) - QUA variable used as iteration variable
        init (QUA expression) - an expression which sets the initial value of the iteration variable
        cond (QUA expression) - an expression which evaluates to a boolean, determines if to
        continue to next loop iteration
        update (QUA expression) - an expression to add to var with each loop iteration
    Example:
```
>>> x = declare(fixed)
>>> with for(var=x, init=0, cond=x<=1, update=x+0.1):
>>> play('pulse', 'qe')
```
if(condition)
    If flow control statement in QUA.
    To be used with a context manager.
    The QUA code block following the statement will be executed only if condition evaluates to
    true.
    Parameters
        condition - A boolean expression to evaluate TABLE 2-continued QUA programming constructs Example:
    >>> x=declare(int)
    >>> with if_(x>0):
    >>>    play('pulse', 'qe')
else
    Else flow control statement in QUA.
    To be used with a context manager.
    Must appear after an if( ) statement.
    The QUA code block following the statement will be executed only if expression in
    preceding if( ) statement evaluates to false.
    Example:
    >>> x=declare(int)
    >>> with if(x>0):
    >>>    play('pulse', 'qe')
    >>> with else( ):
    >>>    play('other_pulse', 'qe')
IO1, IO2
    Reserved variables which operate just like other QUA variables but which refer to dedicated
    registers/memory locations in the I/O Manager 368 that can be read from and written to in
    real time in a pulse program and via the quantum machine manager API
    Example usage in a QUA program:
    >>>    pause( )
    >>>    play(pulse1*amp(IO1), qubit2)
stream_processing
    A code block that contains one or more statements defining processing to be performed,
    during execution of a pulse program, by the quantum-classical compute engine on one or
    more data streams from the quantum controller 210 (e.g., a stream of qubit state
    estimations).
Buffer(N) stream operator
    Creates a new stream where each event of the new stream occurs every N events of the
    operated-upon stream and contains the previous N events of operated-upon stream.
average( ) stream operator
    Creates a new stream in which each event of the new stream is the current running average
    of the events operated-upon stream.
map([FUNCTION]) stream operator
    Where each event of the operated-upon stream is vector (e.g., a vector of state estimates of
    multiple qubits), map([FUNCTION]) iteratively applies FUNCTION the values of the vector to
    produce a new stream where each event is a scalar.
zip(STREAM) stream operator
    Generates a new stream by combining the operated-upon stream with the stream identified
    by the STREAM (e.g., the events of the new stream alternate between events of the operated-
    upon stream and events of the stream identified by the STREAM parameter)
save all("[TAG]") terminal operator
    Save each event of operated-upon stream to the [TAG] field of the results object. Each call
    overwrites the value of the [TAG] field with the current value of STREAM1.
    Does not return a stream but creates a new result
save_all("[TAG]") terminal operator
    Save each event of the operated-upon stream to the [TAG] field of the results object. Each call
    appends the current value of STREAM1 tag field of the results object.
    Does not return a stream but creates a new result The Play statement in QUA instructs the quantum controller 210 to send the indicated pulse to the indicated element. The quantum controller 210 will modify or manipulate the pulse according to the element's properties defined in the quantum machine specification (i.e., the compiler will generate the required pulse modification settings which will then be stored to the appropriate one or more of pulse modification settings circuit(s)), so the user is relieved of the burden of having to specify the modifications/manipulations in each individual Play statement.

A measurement statement instructs the quantum controller 210 to: (1) Send the indicated pulse to the indicated element, manipulating the waveforms in the same manner that is described in the play statement section above; (2) After a time period time_of_flight (e.g., given in ns), sample the returning pulse at the quantum controller 210 input port/s that is/are connected to the output/s of the element. It saves the sampled data under stream_name (unless stream_name=None, in which case the sampled data will not be saved). The sampling time window will be of a duration that is the duration of the pulse plus twice the smearing (e.g., given in ns). This accounts for the returning pulse that is longer than the sent pulse due to the response of the quantum device, as well as for the cables and other elements in the pulse's path; and (3) Process the sampled data according to the parameters specified in the measure statement.

An example of processing the sampled data according to a measure statement is demodulation of the sampled data with a frequency intermediate_frequency, defined in the definition of the element, weighted integration of the demodulated data with integration parameters ("integration_weights") that are defined in the quantum machine specification and are specified in the measure statement, and storing of the result to the memory location referenced by the indicated variable. Another example of processing the sampled data according to a measure statement is processing of the data by a neural network with parameters defined in the quantum machine specification and/or specified in the measure statement and storing of the result to the memory location referenced by the indicated variable which can be a scalar or a vector.

Another example of processing the sampled data according to a measure statement is when the element's output is a digital output and thus the sampled data are digital. One example processing of this data can be counting of the number of digital pulses that arrive to the relevant controller's input in a given time window. Another example may be the time tagging of the arrival of pulses that arrive in a given time window relative to the beginning of the window.

Referring again to FIG. 2A, the quantum controller 210 comprises circuitry operable to generate outbound pulses and control signals and process inbound pulses. An example implementation of the quantum controller 210 is described below with reference to FIG. 3.

The auxiliary components 217 include mixers, signal generators, amplifiers, and/or other components which, for various reasons (e.g., size, cost, etc.), are not integrated into the quantum controller 210 or the quantum system 218. In some implementations, all such components may be integrated into the quantum controller 210 and/or quantum system 218 and the auxiliary component are not necessary.

The quantum system 218 comprises K (an integer) quantum elements 122, which includes qubits (which could be of any type such as superconducting, spin qubits, ion trapped, etc.), and, where applicable, any other element(s) for processing quantum information, storing quantum information (e.g. storage resonator), and/or coupling the outbound quantum control pulses and inbound quantum control pulses to the quantum element(s) 122 (e.g., readout resonator(s)). Other elements of the quantum system 218 may include, for example, flux lines electronic lines for carrying current), gate electrodes (electrodes for voltage gating), current/voltage lines, amplifiers, classical logic circuits residing in the quantum system 218, and/or the like.

Figure 3:
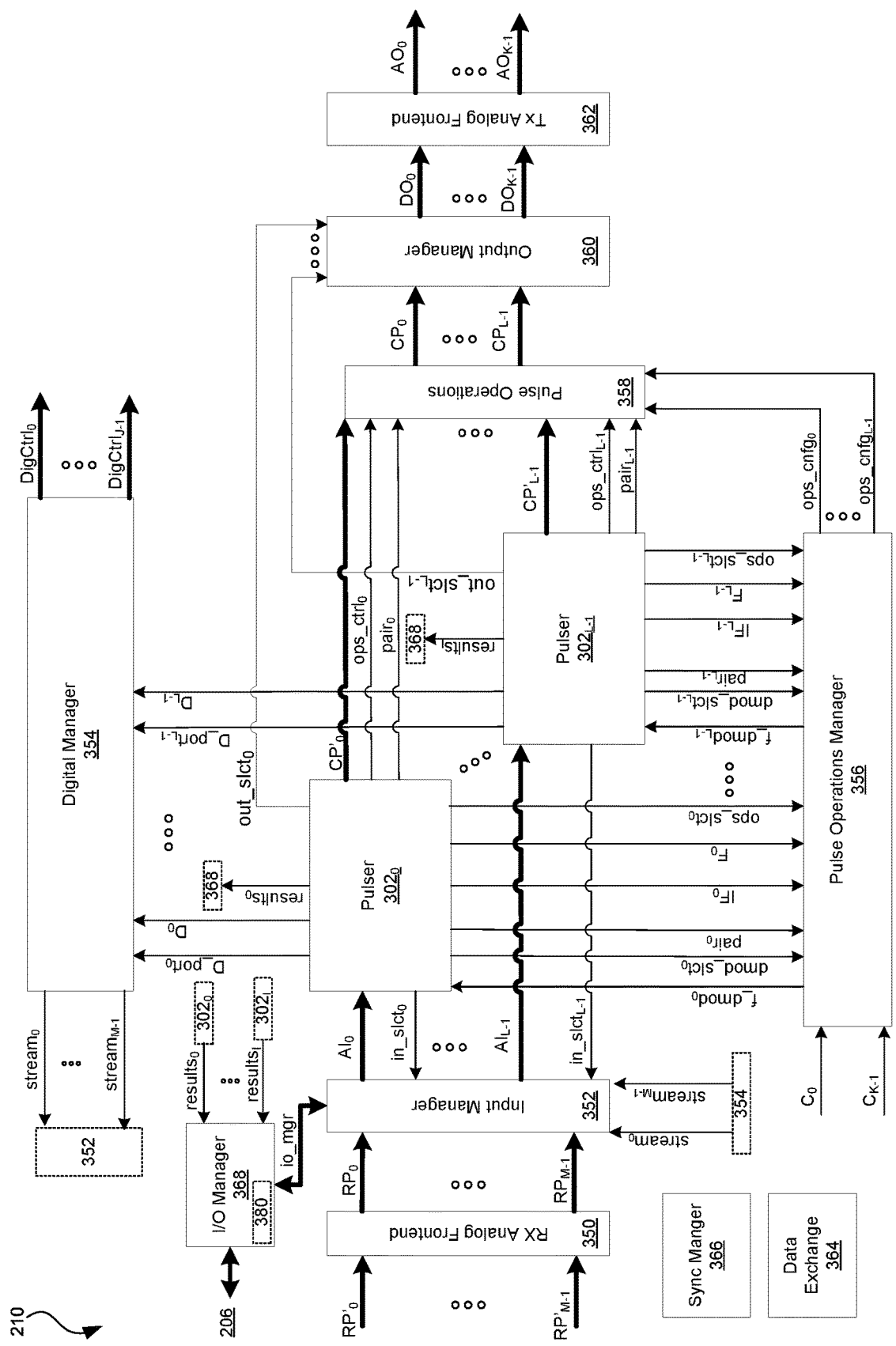
FIG. 3 shows an example implementation of the quantum controller circuitry of FIG. 2A.

FIG. 3 shows an example implementation of the quantum controller of FIG. 2A. The example quantum controller shown comprises pulsers $302_1$-$302_{L-1}$, receive analog frontend 350, input manager 352, digital manager 354, pulse operations manager 356, pulse operations circuitry 358, output manager 360, transmit analog frontend 362, data exchange 364, synchronization manager 366, and input/output ("I/O") manager 368. The depicted circuits may reside on a plurality of interconnected, but physically separate quantum control modules (e.g., each module being a desktop or rack mounted device) such that quantum control systems requiring relatively fewer resources can be realized with relatively fewer quantum control modules and quantum control systems requiring relatively more resources can be realized with relatively more quantum control modules.

In the example implementation shown, each pulser circuit $302_I$ (I an integer between 0 and L−1) comprises circuitry for generating pulses (which may be, for example, control pulses sent to the quantum system 218 to manipulate one or more properties of one or more quantum elements—e.g., manipulate a state of one or more qubits, manipulate a frequency of a qubit using flux biasing, etc., and/or readout a state of one or more quantum elements), processing inbound pulses (e.g., return pulses from readout resonators), and generating digital control signals. The pulses and signals are generated and processed according to quantum control operations to be performed on the quantum system 218. This involves very precisely controlling characteristics such as phase, frequency, amplitude, and timing of the outbound pulses. The characteristics of an outbound pulse generated at any particular time may be determined, at least in part, on inbound pulses received from the quantum system 218 at a prior time. In an example implementation, the time required to close the feedback loop (i.e., time from receiving a first pulse (e.g., at an analog to digital converter) to sending a second pulse (e.g., at an output of a digital-to-analog converter), where the second pulse is based on the first pulse, is significantly less than the coherence time of the qubits of the quantum system 218. For example, the time to close the feedback loop may be on the order of 100 nanoseconds.

Circuitry of the quantum controller 210, and connections between the quantum controller 210 and the quantum system 218, enable any pulser $302_I$ to generate pulses for different quantum elements at different times, which can reduce the number of pulsers $302_0$-$302_{L-1}$ (i.e., reduce L.) required to support a given number of quantum elements (thus saving significant resources, cost, size, overhead when scaling to larger numbers of qubits, etc.).

The ability of a pulser $302_I$ to generate pulses for different quantum elements at different times also enables reduced latency. As just one example, assume a quantum algorithm which needs to send a pulse to quantum element 122c at time T1, but whether the pulse is to be of a first type or second type (e.g., either an X pulse or a Hadamard pulse) cannot be determined until after processing an inbound readout pulse at time T1-DT (i.e., DT time intervals before the pulse is to be output). If there were a fixed assignment of pulsers $302_0$-$302_{L-1}$ to quantum elements of the quantum system 218 (i.e., if $302_0$ could only send pulses to quantum element $122_0$, and pulser $302_1$ could only send pulses to quantum element $122_1$, and so on), then pulser $302_0$ might not be able to start generating the pulse until it determined what the type was to be. In quantum controller 210, on the other hand, pulser $302_0$ can start generating the first type pulse and pulser $302_1$ can start generating the second type pulse and then either of the two pulses can be released as soon as the necessary type is determined, Thus, if the time to generate the pulse is $T_{lat}$, in this example the example quantum controller 210 may reduce latency of outputting the pulse by $T_{lat}$.

The processing of the inbound and outbound pulses in the quantum controller 210 may take place in the digital domain and/or the analog domain. The processing may comprise, for example: frequency translation/modulation, phase translation/modulation, frequency and/or time division multiplexing, time and/or frequency division demultiplexing, amplification, attenuation, filtering in the frequency domain and/or time domain, time-to-frequency-domain or frequency-to-time-domain conversion, upsampling, downsampling, and/or any other signal processing operation. At any given time, the decision as to whether and which pulses to generate and/or process may be: predetermined (at least in part) in the pulse program description 206, and/or dynamically determined (at least in part) during runtime of the pulse program based on classical programs/computations performed during runtime (e.g., based on classical computations to detect characteristics of inbound pulses). As an example of predetermined pulse generation and routing, a pulse program description 206 may simply specify that a particular pulse with predetermined characteristics is to be sent to a particular quantum element of quantum system 218 at a predetermined time. As an example of dynamic pulse determination and routing, a pulse program description 206 may specify that an inbound readout pulse at time T-DT should be analyzed and its characteristics (e.g., phase, frequency, and/or amplitude) used to determine whether, at time T, pulser $302_I$ should output a pulse to a first quantum element or to a second quantum element. As another example, the pulse characteristics determined during runtime may determine whether at time T pulser $302_I$ should output a first pulse to a first quantum element or a second pulse to the first quantum element.

The receive analog frontend 350 comprises circuitry operable to concurrently process up to M (an integer≥1) analog inbound signals ($RP'_0$-$RP'_{M-1}$) to generate up to M concurrent inbound signals ($RP_0$-$RP_{M-1}$) to be output to input manager 352. Although there is shown to be M signals RP and M signals RP', this need not be the case. Such processing may comprise, for example, analog-to-digital conversion, filtering, upconversion, downconversion, amplification, attenuation, time division multiplexing/demultiplexing, frequency division multiplexing/demultiplexing, and/or the like. In various implementations, M may be less than, equal to, or greater than L and M may be less than, equal to, or greater than K.

The input manager 352 comprises circuitry operable to route any one or more of signals ($RR_0$-$RP_{M-1}$) to any one or more of pulsers $302_0$-$302_{L-1}$ (as signal(s) $AI_0$-$AI_{L-1}$) and/or to other circuits (e.g. as signal io_mgr to I/O manager 368). In an example implementation, the input manager 352 comprises one or more switch networks, multiplexers, and/or the like for dynamically reconfiguring which signals $RP_0$-$RP_{M-1}$ are routed to which pulsers $302_0$-$302_{L-1}$. This may enable time division multiplexing multiple of the signals $RP_0$-$RP_{M-1}$ onto a single signal $AI_l$ and/or time division demultiplexing components (e.g., time slices) of a signal $RP_m$ onto multiple of the signals $AI_0$-$AI_{L-1}$. In an example implementation, the input manager 352 comprises one or more mixers and/or filters for frequency division multiplexing multiple of the signals $RP_0$-$RP_{M-1}$ onto a single signal $AI_l$ and/or frequency division demultiplexing components (e.g., frequency bands) of a signal $RP_m$ onto multiple of the signals $AI_0$-$AI_{L-1}$. The signal routing and multiplexing/demultiplexing functions performed by the input manager 352 enables: a particular pulser $302_l$ to process different inbound pulses from different quantum elements at different times; a particular pulser $302_l$ to process different inbound pulses from different quantum elements at the same time; and multiple of the pulsers $302_0$-$302_{L-1}$ to processes the same inbound pulse at the same time. In the example implementation shown, routing of the signals $RP_0$-$RP_{M-1}$ among the inputs of the pulsers $302_0$-$302_{L-1}$ is controlled by digital control signals in_$slct_0$-in_$slct_{L-1}$ from the pulsers $302_0$-$302_{L-1}$. In another implementation, the input manager may be operable to autonomously determine the appropriate routing (e.g., where the pulse program description 206 includes instructions to be loaded into memory of, and executed by, the input manager 352). In the example implementation, the input manager 352 is operable to route input signals $RP_0$-$RP_{M-1}$ to the I/O manager 368 (as signal(s) io_mgr), to be sent to the quantum orchestration server 211. This routing may, for example, be controlled by signals from the digital manager 354. In an example implementation, for each input signal $RP_m$ there is a digital signal, $stream_m$, from the digital manager 354 to the input manager 352 that controls whether $RP_m$ will be sent from the input manager 352 to the I/O manager 368 and from there to the quantum orchestration server 211.

Each of the pulsers $302_0$-$302_{L-1}$ is as described above with reference to FIG. 3. In the example implementation shown, each pulser $302_l$ is operable to generate raw outbound pulses $CP'_l$ ("raw" is used simply to denote that the pulse has not yet been processed by pulse operations circuitry 358) and digital control signals in_$slct_l$, D_$port_l$, $D_l$, out_$slct_l$, ops_$ctrl_l$, ops_$slct_l$, $IF_l$, $F_l$, and dmod_$slct_l$ for carrying out quantum algorithms on the quantum system 218, and $results_l$ for carrying intermediate and/or final results generated by the pulser $302_l$ to the quantum orchestration server 211. One or more of the pulsers $302_0$-$302_{L-1}$ may receive and/or generate additional signals which are not shown in FIG. 3 for clarity of illustration. Each of the pulsers $302_l$ is operable to receive inbound pulse signal $AI_l$ and signal f_$dmod_l$. Pulser $302_l$ may process the inbound signal $AI_l$ to determine the state of certain quantum element(s) in the quantum system 218 and use this state information for making decisions, for example, which raw outbound pulse $CP'_l$ to generate next, when to generate it, and what control signals to generate to affect the characteristics of that raw outbound pulse appropriately. Pulser $302_l$ may use the signal f_$dmod_l$ for determining how to process inbound pulse signal $AI_l$. As an example, when pulser $302_1$ needs to process an inbound signal $AI_1$ from quantum element $122_3$, it can send a dmod_$slct_1$ signal that directs pulse operations manager 356 to send, on f_$dmod_1$, settings to be used for demodulation of an inbound signal $AI_1$ from quantum element $122_3$ (e.g., the pulse operations manager 356 may send the value $cos(\omega_3 * TS * T_{clk1} + \phi_3)$, where $\omega_3$ is the frequency of quantum element $122_3$, TS is amount of time passed since the reference point, for instance the time at which a pulse program started running, and $\phi_3$ is the phase of the total frame rotation of quantum element $122_3$, i.e. the accumulated phase of all frame rotations since the reference point).

The pulse operations circuitry 358 is operable to process the raw outbound pulses $CP'_0$-$CP'_{L-1}$ to generate corresponding output outbound pulses $CP_0$-$CP_{L-1}$. This may comprise, for example, manipulating the amplitude, phase, and/or frequency of the raw pulse $CP'_l$. The pulse operations circuitry 358 receives raw outbound pulses $CP'_0$-$CP'_{L-1}$ from pulsers $302_0$-$302_{L-1}$, control signals ops_$cnfg_0$-ops_$cnfg_{L-1}$ from pulse operations manager 356, and ops_$ctrl_0$-ops_$ctrl_{L-1}$ from pulsers $302_0$-$302_{L-1}$.

The control signal ops_$cnfg_l$ configures, at least in part, the pulse operations circuitry 358 such that each raw outbound pulse $CP'_l$ that passes through the pulse operations circuitry 358 has performed on it one or more operation(s) tailored for that particular pulse. To illustrate, denoting a raw outbound pulse from pulser $302_3$ at time T1 as $CP'_{3,T1}$, then, at time T1 (or sometime before T1 to allow for latency, circuit setup, etc.), the digital control signal ops_$cnfg_3$ (denoted ops_$cnfg_{3,T1}$ for purposes of this example) provides the information (e.g., in the form of one or more matrix, as described below) as to what specific operations are to be performed on pulse $CP'_{3,T1}$. Similarly, ops_$cnfg_{4,T1}$ provides the information as to what specific operations are to be performed on pulse $CP'_{4,T1}$, and ops_$cnfg_{3,T2}$ provides the information as to what specific operations are to be performed on pulse $CP'_{4,T1}$.

The control signal ops_$ctrl_l$ provides another way for the pulser $302_l$ to configure how any particular pulse is processed in the pulse operations circuitry 358. This may enable the pulser $302_l$ to, for example, provide information to the pulse operations circuitry 358 that does not need to pass through the pulse operation manager 356. For example, the pulser $302_l$ may send matrix values calculated in real-time by the pulser $302_l$ to be used by the pulse operations circuitry 358 to modify pulse $CP'_l$. These matrix values arrive to the pulse operations circuitry 358 directly from the pulser $302_l$ and do not need to be sent to the pulse operation manager first. Another example may be that the pulser $302_l$ provides information to the pulse operations circuitry 358 to affect the operations themselves (e.g. the signal ops_$ctrl_l$ can choose among several different mathematical operations that can be performed on the pulse).

The pulse operations manager 356 comprises circuitry operable to configure the pulse operations circuitry 358 such that the pulse operations applied to each raw outbound pulse $CP'_I$ are tailored to that particular raw outbound pulse. To illustrate, denoting a first raw outbound pulse to be output during a first time interval T1 as $CP'_{I,T1}$, and a second raw outbound pulse to be output during a second time interval T2 as $CP'_{I,T2}$, then pulse operations circuitry 358 is operable to perform a first one or more operations on $CP'_{I,T1}$ and a second one or more operations on $CP'_{I,T2}$. The first one or more operations may be determined, at least in part, based on to which quantum element the pulse $CP_{I,T1}$ is to be sent, and the second one or more operations may be determined, at least in part, based on to which quantum element the pulse $CP_{I,T2}$ is to be sent. The determination of the first one or more operations and second one or more operations may be performed dynamically during runtime.

The transmit analog frontend 362 comprises circuitry operable to concurrently process up to K digital signals $DO_k$ to generate up to K concurrent analog signals $AO_k$ to be output to the quantum system 218. Such processing may comprise, for example, digital-to-analog conversion, filtering, upconversion, downconversion, amplification, attenuation, time division multiplexing/demultiplexing, frequency division multiplexing/demultiplexing and/or the like. Although there is one-to-one correspondence between the number of DO signals and the number of AO signals in the example implementation described here, such does not need to be the case. In another example implementation, the analog frontend 362 is operable to map more (or fewer) signals DO to fewer (or more) signals AO. In an example implementation the transmit analog frontend 362 is operable to process digital signals $DO_0$-$DO_{K-1}$ as K independent outbound pulses, as K/2 two-pulse pairs, or process some of signals $DO_0$-$DO_{K-1}$ as independent outbound pulses and some signals $DO_0$-$DO_{K-1}$ as two-pulse pairs (at different times and/or concurrently).

The output manager 360 comprises circuitry operable to route any one or more of signals $CP_0$-$CP_{L-1}$ to any one or more outputs of the quantum controller 210. In an example implementation, the output manager 360 comprises one or more switch networks, multiplexers, and/or the like for dynamically reconfiguring which one or more signals are routed to which outputs of the quantum controller 210. This may enable time division multiplexing multiple of the signals $CP_0$-$CP_{L-1}$ onto a single output and/or time division demultiplexing components (e.g., time slices) of a signal $CP_m$ onto multiple outputs. In an example implementation, the output manager 360 comprises one or more mixers and/or filters for frequency division multiplexing multiple of the signals $CP_0$-$CP_{M-1}$ onto a single output and/or frequency division demultiplexing components (e.g., frequency bands) of a signal $CP_m$ onto multiple outputs. The signal routing and multiplexing/demultiplexing functions performed by the output manager 360 enables: routing outbound pulses from a particular pulser 302$_I$ to different outputs (and thus different quantum elements) at different times; routing outbound pulses from a particular pulser 302$_I$ to multiple outputs at the same time; and multiple of the pulsers 302$_0$-302$_{L-1}$ generating pulses for the output at the same time. In the example implementation shown, routing of the signals $CP_0$-$CP_{L-1}$ among outputs of the quantum controller 210 is controlled by digital control signals out_slct$_0$-out_slct$_{L-1}$ from the pulsers 302$_0$-302$_{L-1}$. In another implementation, the output manager 360 may be operable to autonomously determine the appropriate routing (e.g., where the pulse generation program machine code 268 includes instructions to be loaded into memory of, and executed by, the output manager 360). In an example implementation, at any given time, the output manager 360 is operable to concurrently route K of the digital signals $CP_0$-$CP_{L-1}$ as K independent outbound pulses, concurrently route K/2 of the digital signals $CP_0$-$CP_{L-1}$ as two-pulse pairs, or route some of signals $CP_0$-$CP_{L-1}$ as independent outbound pulses and some others of the signals $CP_0$-$CP_{L-1}$ as multi-pulse sets (at different times and/or concurrently).

The digital manager 354 comprises circuitry operable to process and/or route digital control signals (DigCtrl$_0$-DigCtrl$_{J-1}$) to various circuits of the quantum controller 210 and/or external circuits coupled to the quantum controller 210. In the example implementation shown, the digital manager receives, from each pulser 302$_I$, a digital signal $D_I$ that is to be processed and routed by the digital manager 354, and a control signal D_port$_I$ that indicates to which output port(s) of the digital manager 354 the signal $D_I$ should be routed. The digital control signals may be routed to, for example, any one or more of circuits shown in FIG. 3, switches/gates which connect and disconnect the outputs $AO_0$-$AO_{K-1}$ from the quantum system 218, external circuits coupled to the quantum controller 210 such as microwave mixers and amplifiers, and/or any other circuitry which can benefit from e-n-real-time information from the pulser circuits 302$_0$-302$_{L-1}$. Each such destination of the digital signals may require different operations to be performed on the digital signal (such as delay, broadening, or digital convolution with a given digital pattern). These operations may be performed by the digital manager 354 and may be specified by control signals from the pulsers 302$_0$-302$_{L-1}$. This allows each pulser 302$_I$ to generate digital signals to different destinations and allows different ones of pulsers 302$_0$-302$_{L-1}$ to generate digital signals to the same destination while saving resources.

The synchronization manager 366 comprises circuitry operable to manage synchronization of the various circuits shown in FIG. 3. Such synchronization is advantageous in a modular and dynamic system, such as quantum controller 210, where different ones of pulsers 302$_0$-302$_{L-1}$ generate, receive, and process pulses to and from different quantum elements at different times. For example, while carrying out a quantum algorithm, a first pulser circuit 302$_1$ and a second pulser circuit 302$_2$ may sometimes need to transmit pulses at precisely the same time and at other times transmit pulses independently of one another. In the example implementation shown, the synchronization manager 366 reduces the overhead involved in performing such synchronization.

The data exchange circuitry 364 is operable to manage exchange of data among the various circuits shown in FIG. 3. For example, while carrying out a quantum algorithm, a first pulser circuit 302$_1$ and a second pulser circuit 302$_2$ may sometimes need to exchange information. As just one example, pulser 302$_1$ may need to share, with pulses 302$_2$, the characteristics of an inbound signal AI$_1$ that it just processed so that pulser 302$_2$ can generate a raw outbound pulse CP'$_2$ based on the characteristics of AI$_1$. The data exchange circuitry 364 may enable such information exchange. In an example implementation, the data exchange circuitry 364 may comprise one or more registers to and from which the pulsers 302$_0$-302$_{L-1}$ can read and write.

The I/O manager 368 is operable to route information between the quantum controller 210 and the quantum orchestration server 211. Machine code quantum pulse program descriptions may be received via the I/O manager 368. Accordingly, the I/O manager 368 may comprise circuitry for loading the machine code into the necessary registers/memory (including any SRAM, DRAM, FPGA BRAM, flash memory, programmable read only memory, etc.) of the quantum controller 210 as well as for reading contents of the registers/memory of the quantum controller 210 and conveying the contents to the quantum orchestration server 211. The I/O manager 368 may, for example, include a PCIe controller, AXI controller/interconnect, and/or the like. In an example implementation, the I/O manager 368 comprises one or more registers 380 which can be written to and read from via a quantum machine API and via reserved variables in the language used to create pulse program description 206.

Figure 4:
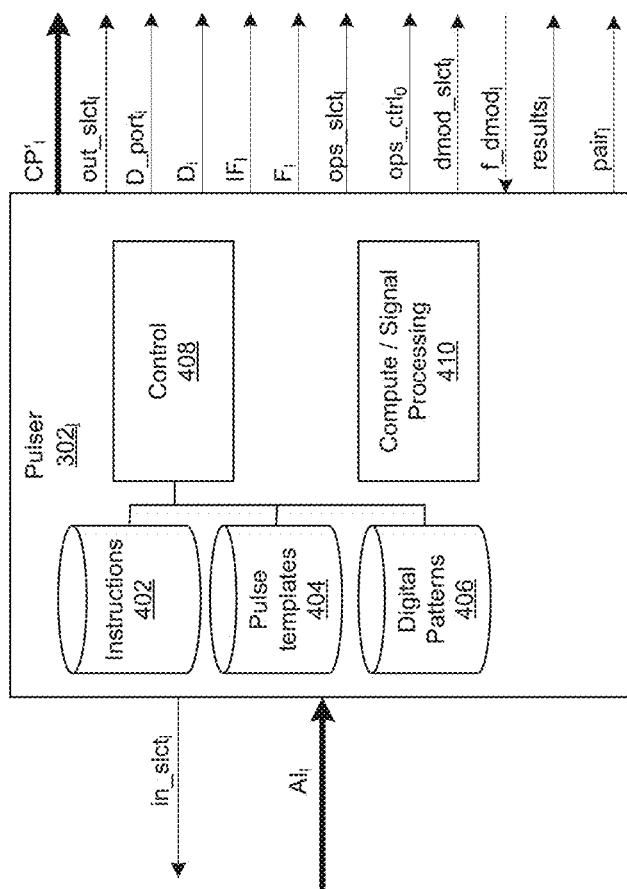
FIG. 4 shows an example implementation of the pulser of FIG. 3.

FIG. 4 shows an example implementation of the pulser of FIG. 3. The example pulser 302; shown comprises instruction memory 402, pulse template memory 404, digital pattern memory 406, control circuitry 408, and compute and/or signal processing circuitry (CSP) 410.

The memories 402, 404, 406 may comprise one or more be any type of suitable storage elements (e.g., DRAM, SRAM, Flash, etc.). The instructions stored in memory 402 are instructions to be executed out by the pulser 302; for carrying out its role in a quantum algorithm. Because different pulsers $302_0$-$302_{L-1}$ have different roles to play in any particular quantum algorithm (e.g., generating different pulses at different times), the instructions memory 402 for each pulser $302_I$ may be specific to that pulser. For example, the machine code from the quantum orchestration server 211 may comprise a first set of instructions to be loaded (via I/O manager 368) into pulser $302_0$, a second set of instructions to be loaded into pulser $302_1$, and so on. Each pulse template stored in memory 404 comprises a sequence of one or more samples of any arbitrary shape (e.g., Gaussian, sync, impulse, etc.) representing the pulses to be sent to pulse operations circuitry 358. Each digital pattern stored in memory 406 comprises a sequence of one or more binary values which may represent the digital pulses to be sent to the digital manager 354 for generating digital control signals $DigCtrl_0$-$DigCtrl_{J-1}$.

The control circuitry 408 is operable to execute the instructions stored in memory 402 to process inbound signal $AI_I$, generate raw outbound pulses $CP'_I$, and generate digital control signals in_$slct_I$, out_$slct_I$, D-$port_I$, $D_I$, $IF_I$, $F_I$, ops_$slct_I$, ops_$ctrl_I$, $results_I$, dmod_$slct_I$ and $pair_I$. In the example implementation shown, the processing of the inbound signal $AI_I$ is performed by the CSP circuitry 410 and based (at least in part) on the signal f_$dmod_I$.

The compute and/or signal processing circuitry (CSP) 410 is operable to perform computational and/or signal processing functions, which may comprise, for example Boolean-algebra based logic and arithmetic functions and demodulation (e.g., of inbound signals $AI_I$). The CSP 410 may comprise memory in which is stored instructions for performing the functions and demodulation. The instructions may be specific to a quantum algorithm to be performed and be generated during compilation of a quantum machine specification and QUA program.

In operation of an example implementation, generation of a raw outbound pulse $CP'_I$ comprises the control circuitry 408: (1) determining a pulse template to retrieve from memory 404 (e.g., based on a result of computations and/or signal processing performed by the CSP 410); (2) retrieving the pulse template; (3) performing some preliminary processing on the pulse template; (4) determining the values of F, IF, $pair_I$, ops_$slct_I$, and dmod_$slct_I$ to be sent to the pulse operation manager 356 (as predetermined in the pulse program description 206 and/or determined dynamically based on results of computations and/or signal processing performed by the CSP 410); (5) determining the value of ops_$ctrl_I$ to be sent to the pulse operations circuitry 358; (6) determining the value of in_$slct_I$ to be sent to the input manager 352; (7) determining a digital pattern to retrieve from memory 406 (as predetermined in the pulse program description 206 and/or determined dynamically based on results of computations and/or signal processing performed by the CSP 410); (8) outputting the digital pattern as $D_I$ to the digital manager along with control signal D_$port_I$ (as predetermined in the pulse program description and/or determined dynamically based on results of computations and/or signal processing performed by the CSP 410); (9) outputting the raw outbound pulse $CP'_I$ to the pulse operations circuitry 358; (10) outputting $results_I$ to the I/O manager.

FIGS. 5A-5C show an example quantum machine specification. The example shown uses PYTHON™ as a host language. The example quantum machine specification is a PYTHON™ dictionary with a key of "config" and a value that comprises a plurality of nested objects, some of which are key-value pairs and some of which are nested dictionaries.

The "version" key-value pair which indicates the version of the quantum machine specification schema being used.

The "controllers" object is used to specify the number of modules/units that make up the quantum controller 210 of the quantum machine. The example shown specifies just a single quantum control module named "con1", which is of type "opx1" (different opx types may, for example, indicate different hardware and/or configuration of the hardware). For each controller 210, the output and input ports that are used in the quantum machine are specified. For analog outputs and inputs, DC offset voltage is specified as well.

The "elements" object is used to specify elements that are connected to output and input ports of the controller 210. Such elements may include quantum elements (e.g., qubits, readout resonators, flux lines, etc.), external devices (e.g., test equipment such as oscilloscopes, spectrum analyzers, signal generators, etc.), and/or any other element connected to the output and/or input ports of the controller. The example shown in FIG. 5A specifies a qubit named "qubit" and a readout resonator named "RR". The "qubit" element comprises "mixinputs", "operations", and "frequency" objects. The "mixinputs" object comprises "I", "Q", "lo_frequency", and "mixer" objects. The "I" and "Q" objects specify the corresponding output ports of "con1" to which the inputs of the element are connected. The "intermediate_frequency" object specifies the intermediate frequency with which pulses sent to the qubit are to be modulated (e.g., determined from a qubit calibration routine). The "mixer" object refers to mixer object "mixer_quibit," which is defined later in the quantum machine specification. The "operations" object specifies a "gauss-pulse" which refers to the "gauss_pulse_in" object, which is defined later in the quantum machine specification. The "RR" element comprises "mixinputs", "operations", "outputs", "frequency", "time_of_flight", and "smearing" objects. The "mixinputs" object comprises "I", "Q", "lo_frequency", and "mixer" objects. The "I" and "Q" objects specify the corresponding ports of "con1". The "frequency" object specifies the frequency of the readout_resonator (e.g., determined from a qubit calibration routine). The "mixer" object refers to mixer object "mixer_res," which is defined later in the quantum machine specification. The "operations" object specifies a "meas_pulse" which refers to the "meas_pulse_in" object, which is defined later in the quantum machine specification. The "time_of_flight" and "smearing" objects specify those values for the readout resonator. The "outputs" object specifies an output on the element "out1" and the corresponding input port of "con1" to which it is connected.

The "Pulses" object is used to specify pulses available for transmission by the quantum machine. The example shown specifies two pulses: "means_pulse_in" and "gauss_pulse_in." The "means_pulse_in" object in turn comprises "operation", "length", "waveforms", "integration_weights", and "digital_marker" objects. The "operation" object specifies it as a "measurement" pulse. The "I" and "Q" objects of the "waveforms" object refer to the "exc_wf" and "zero_wf" objects which are defined later in the quantum machine specification. The "integration_weights" object refers to the integration weights objects "integW1" and "integW2" which are defined later in the specification. The "digital_marker" object refers to the "marked1" object defined later in the specification.

The "gauss_pulse_in" object comprises "operation", "length", and "waveforms" objects. The "operation" object specifies it is a "control" pulse. The "I" and "Q" objects of the "waveforms" object refer to the "gauss_wf" and "zero_wf" objects which are defined later in the quantum machine specification.

The "waveforms" object defines the "zero_wf", "gauss_wf", and "exc_wf" objects ("exc_wf" not shown) using "type" and "samples" objects.

The "digital_waveforms" defines the "marked" object using a "samples" object.

The "integration_weights" object defines the objects "integW1" and "integW2" using "cosine" and "sine" objects.

The "mixers" object defines the "mixer_res" and "mixer_qubit" objects using "freq", "lo_freq", and "correction" objects.

Figure 6:
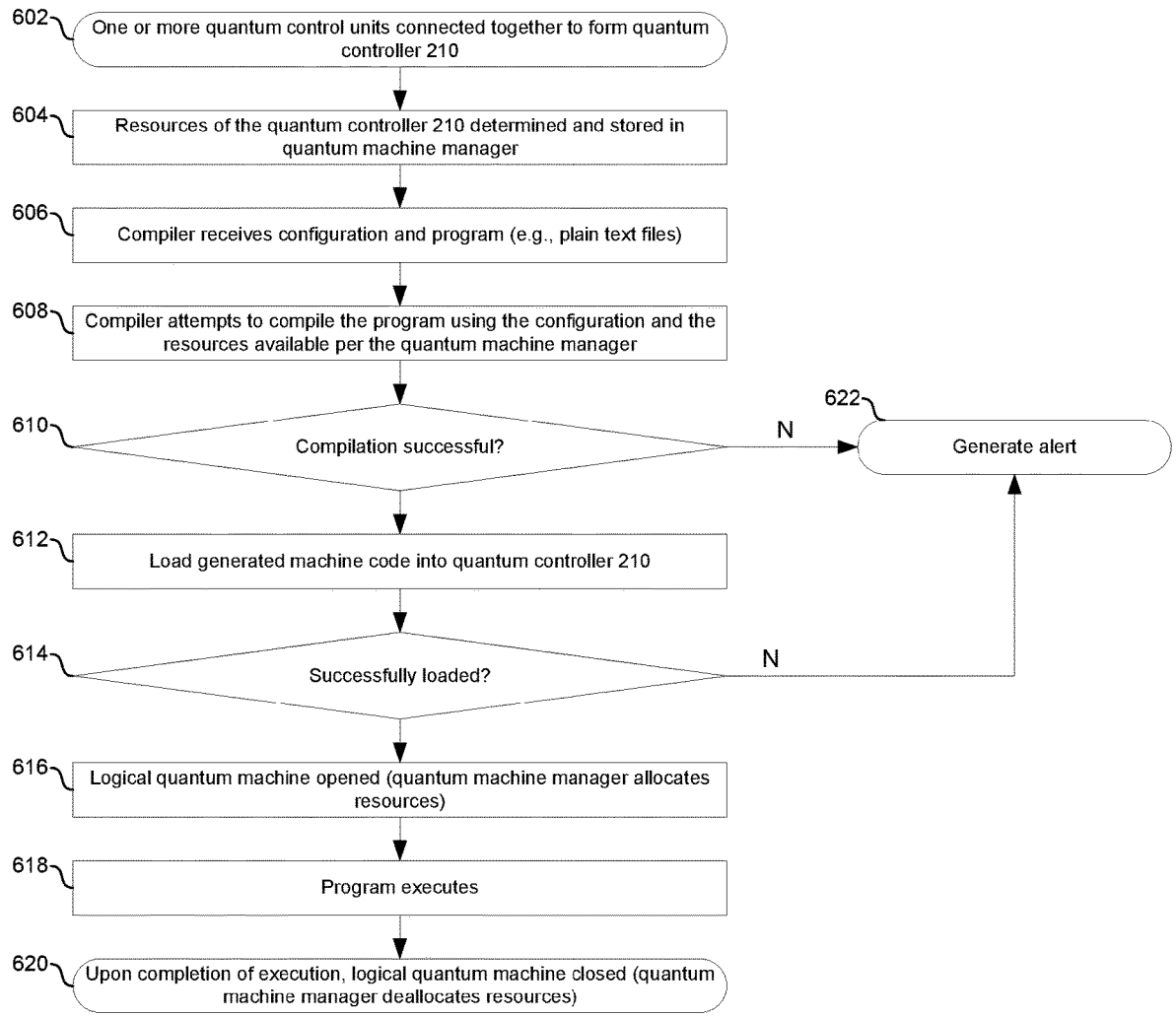
FIG. 6 is a flow chart showing an example operation of the QOP.

FIG. 6 is a flow chart showing an example process for operation of the quantum orchestration platform. The process begins in block 602 in which one or more quantum control modules are connected together to form quantum controller 210 and the quantum controller 210 is connected to a quantum system. In this regard, the quantum controller 210 is modular and extendable enabling use of as many units as desired/necessary for the quantum algorithm to be performed. Each of the modules may, for example, comprise one or more of each of the circuits shown in FIG. 3. The quantum controller 210 is also connected to a quantum orchestration server 211.

Then, a quantum machine with a certain specification is instantiated by a user. This may be done via a Quantum Machines Manager API. In an example of such an API, shown in Table 3, this may include a call to the open_qm( ) function or the open_qm_from_file( ) function.

TABLE 3

Quantum Machines Manager API

Class QuantumMachinesManager (host=None, port=None, **kargs)
    close_all_quantum_machines( )
        Closes ALL open quantum machines
    get_controllers( )
        Returns a list of all the quantum control modules that are available
    get_qm(machine_id)
        Gets an open quantum machine object with the given machine id
        Parameters
            machine_id - The id of the open quantum machine to get
        Returns
            A quantum machine obj that can be used to execute programs
    list_open_quantum_machines( )
        Return a list of open quantum machines. (Returns only the ids, use get_qm(...) to get
        the machine object)
        Returns
        The ids list
    open_qm(config, close_other_machines=True) → qm.QuantumMachine.QuantumMachine
        Opens a new quantum machine
        Parameters
            config - The config that will be used by the name machine
            close_other_machines - Flag whether to close all other running machines
        Returns
            A quantum machine obj that can be used to execute programs
    open_qm_from_file(filename, close other machines=True)
        Opens a new quantum machine with config taken from a file on the local file system
        Parameters
            filename - The path to the file that contains the config
            close_other_machines - Flag whether to close all other running machines
        Returns
            A quantum machine obj that can be used to execute programs
    perform_healthcheck(strict=True)
        Perform a health check against the QM programming subsystem.
        Parameters
            strict - Will raise an exception if health check failed
    version( )
        Returns
            The QM programming subsystem version Then, the quantum machines manager 215 attempts to allocate machine resources (i.e., resources allocated to a particular quantum machine regardless of whether a pulse program is currently executing on that quantum machine) of the quantum controller 210 to the new quantum machine according to the specification.

In block 604, the quantum machines manager 215 determines whether the allocation and instantiation is successful. If not, then an alert is generated for the user (e.g., to inform the user that there are currently insufficient resources available to instantiate the required quantum machine). If allocation is successful, then in block 604 the allocated resources are stored in quantum machines manager 215, which updates its data structure of available resources to reflect the allocation of resources to the quantum machine, the new quantum machine is instantiated, and the process advances.

Then, a user requests to execute a pulse generation program on the quantum machine. This may be done via a Quantum Machine API. In an example of such an API, shown in Table 4, this may include a call to the execute( ) function. Prior to the request to execute the QUA program, and/or during the execution of the QUA program, the user can use a Quantum Machine API, such as the one shown below in table 4, to alter any parameter that was set in the specification 262. This is advantageous where, for example, something (e.g., temperature, voltage, equipment in use, and/or any other factor that may impact a quantum experiment), has changed since the time the specification 262 was generated.

TABLE 4

| Quantum Machine API |
|---|
| Class QuantumMachine(machine_id, pb_config, config, manager)<br>  close( )<br>  Closes the quantum machine.<br>    Returns<br>    True if the close request succeeded, Raises an exception otherwise.<br>  execute(program, duration_limit=1000, data_limit=20000, force_execution=False,<br>  dry_run=False, **kwargs) → qm.QmJob.QmJob<br>    Executes a program and returns a job object to keep track of execution and get results.<br>    Parameters<br>      program - A program( ) object generated in QUA to execute<br>      duration_limit (int) - Maximal time (in msec) for which results will be collected.<br>      data_limit (int) -<br>      Maximal amount of data sends for which results will be collected.<br>      Here data sends is either:<br>        1. 4 ADC samples, in case raw data are transferred<br>        2. a single save operation<br>      force_execution (bool) - Execute program even if warnings occur<br>      dry_run (bool) - compile program but do not run it<br>    No new results will be available to the returned job object When duration_limit is reached,<br>    or when data_limit is reached, whichever occurs sooner.<br>    Returns<br>    A QmJob object that can be used to keep track of the execution and get results<br>  get_config( )<br>    Gives the current config of the qm<br>    Returns<br>    A dictionary with the qm's config<br>  get_dc_offset_by_qe(qe, input)<br>    get the current DC offset of the quantum control module analog output channel<br>    associated with a quantum element.<br>    Parameters<br>      qe - the name of the element to get the correction for<br>      input - the input name as appears in the element's config<br>    Returns<br>    the offset, in normalized output units<br>  get_digital_buffer(qe, digital_input)<br>    get the buffer for digital waveforms of the quantum element<br>    Parameters<br>      qe (str) - the name of the element to get the buffer for<br>      digital_input (str) - the digital input name as appears in the element's config<br>    Returns<br>    the buffer<br>  get_digital_delay(qe, digital_input)<br>    Parameters<br>      qe - the name of the element to get the delay for<br>      digital_input - the digital input name as appears in the element's config<br>    Returns<br>    the delay<br>  get_io1_value( )<br>  Gives the data stored in IO1, which is a reserved variable that refers to a first IO register in<br>  the I/O manager 368.<br>  No inference is made on type.<br>  Returns<br>  A dictionary with data stored in IO1. (Data are in all three format: int, float, bool)<br>  get_io2 value( )<br>    Gives the data stored in IO2, which is a reserved variable that refers to a first IO register<br>    in the I/O manager 368<br>    No inference is made on type.<br>    Returns<br>    A dictionary with data from the second IO register. (Data are in all three format: int, float,<br>    and bool)<br>  get_io_values( )<br>    Gives the data stored in both IO1 and IO2<br>    No inference is made on type.<br>    Returns<br>    A list that contains dictionaries with data from the IO registers. (Data are in all three<br>    format: int, float, and bool) |

TABLE 4-continued

| Quantum Machine API |
|---| get_smearing(qe)
    get the smearing associated with a measurement quantum element.
    This is a broadening of the raw results acquisition window, to account for dispersive
    broadening in the measurement elements (readout resonators etc.) The acquisition
    window will be broadened by this amount on both sides.
    Parameters
    qe (str) - the name of the element to get smearing for
    Returns
    the smearing, in nsec.
get_time_of_flight(qe)
    get the time of flight, associated with a measurement quantum element.
    This is the amount of time between the beginning of a measurement pulse applied to
    quantum element and the time that the data are available to the controller for
    demodulation or streaming.
    Parameters
    qe (str) - the name of the element to get time of flight for
    Returns
    the time of flight, in nsec
list_controllers( )
    Gives a list with the defined controllers in this qm
    Returns
    The names of the controllers configured in this qm
save_config_to_file(filename)
    Saves the qm current config to a file
    Parameters
    filename: The name of the file where the config will be saved
set_correction(qe, values)
Sets the correction matrix for correcting gain and phase imbalances of an IQ mixer associated
with a quantum element.
Parameters
   qe (str - the name of the element to update the correction for
   values (tuple) - 4 value tuple which represents the correction matrix
set_dc_offset_by_qe(qe, input, offset)
    set the current DC offset of the quantum control module analog output channel
    associated with a quantum element.
    Parameters
        qe (str) - the name of the element to update the correction for
        input (str) - the input name as appears in the element config. Options:
            'single'
                for an element with single input
            'I' or 'Q'
                for an element with mixer inputs
        offset (float) - the dc value to set to, in normalized output units. Ranges from −0.5
        to 0.5 - $2^{-16}$ in steps of $2^{-16}$.
set_digital_buffer(qe, digital_input, buffer)
    set the buffer for digital waveforms of the quantum element
    Parameters
        qe (str) - the name of the element to update buffer for
        digital_input (str) - the digital input name as appears in the element's config
        buffer (int) - the buffer value to set to, in nsec. Range: 0 to (255 - delay) / 2, in
        steps of 1
set_digital_delay(qe, digital_input, delay)
    Sets the delay of the digital waveform of the quantum element
    Parameters
        qe (str) - the name of the element to update delay for
        digital_input (str) - the digital input name as appears in the element's config
        delay (int) - the delay value to set to, in nsec. Range: 0 to 255 - 2 * buffer, in
        steps of 1
set_frequency(qe, freq)
    Sets the frequency of an element, at the output of the mixer, taking LO frequency into
    account.
    Parameters
        qe (str) - the name of the element to update the correction for
        freq (float) - the frequency to set to the given element
set_intermediate_frequency(qe, freq)
    Sets the intermediate frequency of the quantum element:
    Parameters
        qe (str) - the name of the element to update the intermediate frequency for
        freq (float) - the intermediate frequency to set to the given element
set_io1_value(value_1)
    Sets the value of IO1.
    This can be used later inside a QUA program as a QUA variable IO1 without declaration.
    The type of QUA variable is inferred from the PYTHON ™ type passed to value_1, according
    to the following rule:
    int -> int float -> fixed bool -> bool
    Parameters
        value_1 (float / bool / int) - the value to be placed in IO1

TABLE 4-continued

Quantum Machine API set_io2_value(value_2)
    Sets the value of IO1
    This can be used later inside a QUA program as a QUA variable IO2 without declaration.
    The type of QUA variable is inferred from the PYTHON ™ type passed to value_2, according
    to the following rule:
    int -> int float -> fixed bool -> bool
    Parameters
    value_1 (float / bool / int) - the value to be placed in IO1
set_io_values(value_1, value_2)
    Sets the value of IO1 and IO2
    This can be used later inside a QUA program as a QUA variable IO1, IO2 without
    declaration. The type of QUA variable is inferred from the PYTHON ™ type passed to
    value_1, value_2 according to the following rule:
    int -> int float -> fixed bool -> bool
    Parameters
        value_1 (float / bool / int) - the value to be placed in IO1
        value_2 (float / bool / int) - the value to be placed in IO2
set_smearing(qe, smearing)
    set the smearing associated with a measurement quantum element.
    This is a broadening of the raw results acquisition window, to account for dispersive
    broadening in the measurement elements (readout resonators etc.) The acquisition
    window will be broadened by this amount on both sides.
    Parameters
        qe (str) - the name of the element to set smearing for
        smearing (int) - the time, in nsec, to broaden the acquisition window. Range: 0 to
        (255 - time of flight)/2, in steps of 1.
set_time_of_flight(qe, time_of_flight)
    set the time of flight, associated with a measurement quantum element.
    This is the amount of time between the beginning of a measurement pulse applied to
    quantum element and the time that the data are available to the controller for
    demodulation or streaming,
    This time also accounts for processing delays, which are typically 176 nsec.
    Parameters
        qe (str) - the name of the element to set time of flight for
        time_of_flight (int) - the time of flight to set, in nsec. Range: 0 to 255 - 2 *
        smearing, in steps of 4.
Resume(job)
Resume execution of the QUA program
   Parameters
      job - A program( ) job object returned by the execute( ) function
wait_for_values(count duration)
    method called on a field of a job object to wait up to a specified amount of time for a
    specified number of values of the field
    Parameters
       count - The number of values to wait for
       duration - the maximum amount of time to wait for the values In block 606, compiler 207 receives the quantum machine specification and the pulse generation program (e.g., in the form of two plain text files).

In block 608, compiler 207 attempts to compile the program using the quantum machine specification and the resources of the quantum controller 210 that the quantum machines manager 215 indicates are available for program execution. During compilation, the compiler determines and allocates the program resources of the quantum controller 210 that will be used in the program.

In block 610, the compiler 207 determines whether compilation is successful. If not, then in block 622 an alert is generated for the user (e.g., to inform the user that there are currently insufficient resources available to execute the program). If compilation is successful, then the process advances to block 612. If compilation is successful the compiler outputs the machine code to be loaded to the quantum controller for program execution.

In block 612, the end-user device 203 loads machine code—generated by the compiler 207 based on the program, the quantum machine specification, and the available resources—into quantum controller 210 and quantum orchestration server 211 (e.g., into hardware which will execute the code to realize the quantum-classical compute engine 213 tailored for the specific quantum machine and pulse generation program).

In block 614, the end-user device_203 determines whether the machine code has been successfully loaded. If not, then in block 622 an alert is generated for the user. If the machine code is successfully loaded, then the process advances to block 616.

In block 616 a quantum machine is opened on the quantum controller 210 and quantum orchestration server 211.

In block 618, the program is executed on the quantum machine. During execution, the quantum machines manager 215 updates its data structure of available resources to reflect the allocation of resources to the program.

In block 620, upon completing execution of the instructions, the program ends and the quantum machines manager 215 updates its data structure to deallocate the program resources that were allocated to that program and updates the available resources.

Either while the program is executing and/or after the program execution is over, the user may change the configuration/specification of the quantum machine. This may be done via a Quantum Machine API, an example implementation of which is shown in Table 4. An example of changing the configuration/specification of the quantum machine may be that the user uses the call to the set_frequency(qe, freq) function, which changes the frequency of the specified element to the specified frequency. Another example is using the quantum machine API to set the value of an IO register in the I/O Manager 368. For example, the following code snippet 1 shows waiting for a QUA program to reach a pause instruction, then 101 is set to a new value via the quantum machine API, and then the QUA program resumes. Upon resumption the program may, for example, branch based on the value of 101.

Code Snippet 1

```
1> job = qm.execute(program)
2> while job.isPaused( ) != True
3>     wait(0.1)
4> qm.set_IO1([new value])
5> job.resume( )
```

In another example implementation, a quantum machines API may include commands for changing any parameter defined in the specification (e.g. an API command may allow to change the definition of the samples of a specified waveform, change the parameters of a neural network associated with an element or a pulse, etc.). If the specification is changed while a program is running on the quantum machine, this may include writing to registers and/or memory of the quantum controller 210 while the program is executing as well as changing the specification in the quantum machines manager 215. If the specification is changed while no program is running on the quantum machine, this may include only changing the specification in the quantum machines manager. The ability to alter characteristics of the quantum machine without closing the quantum machine and even during execution of a pulse generation program on the quantum machine enables, for example, altering the quantum machine based on calculations performed on the quantum-classical compute engine 213. As an example, during execution of a pulse generation program, results may be streamed from the quantum controller 210 to the quantum-classical compute engine 213. The quantum-classical compute engine 213 may react to stream(s) by performing calculations involving the streamed values (e.g., resource-intensive calculations not possible or desirable to perform on the quantum controller 210). The results of the calculations may be used to update the quantum machine (e.g., overwriting parameters specified in the specification 262) and/or the results may be saved for additional post-processing/analysis. The update may impact the currently running pulse generation program or a successive run of the same pulse generation program or a different pulse generation program without having to close the quantum machine for reconfiguration (which may be desirable to, for example, avoid having to repeat a calibration).

In an example implementation, the pulse generation source code 264 is written using the QUA programming language.

Example Qua Program: Power Rabi Calibration

To aid understanding of the quantum orchestration platform's unique approach to quantum control, a use case example of Power Rabi Calibration will now be described, end-to-end. The use case begins by discussing the theoretical background of the experiment and its goals and showing a typical setup on which it is implemented. It is then shown, step by step, how to program the quantum orchestration platform to perform this experiment, how to execute it, and how to retrieve the results.

The purpose of Power Rabi Calibration is to measure Rabi oscillations-oscillations of the qubit state that are driven by a control signal. Assume that the qubit is initially in the ground state (state 0), a drive pulse is applied to rotate the qubit on the Bloch sphere around a rotation axis in the x-y plane. The qubit is then measured by calculating the effect of the resonator (that is coupled to the qubit) on a measurement pulse. The rotation angle, and consequently the probability to find the qubit in the excited state (1), depends on the amplitude of the drive pulse. The protocol is repeated with varying amplitudes (a). For each amplitude, the protocol is repeated many times for averaging, which allows extracting the probability of the qubit to be in the excited state after the drive pulse is applied. This probability is then plotted as a function of the drive amplitude, from which the rotation angle, as a function of the amplitude, can be extracted. This experiment provides an important tool for calibrating quantum gates. For example, the amplitude at which the qubit reaches a rotation of 180 degrees gives us the required amplitude for performing an X-gate (the quantum NOT gate). Similarly, this program can be run to identify the amplitude required to perform a $\pi/2$-rotation.

Figure 7A:
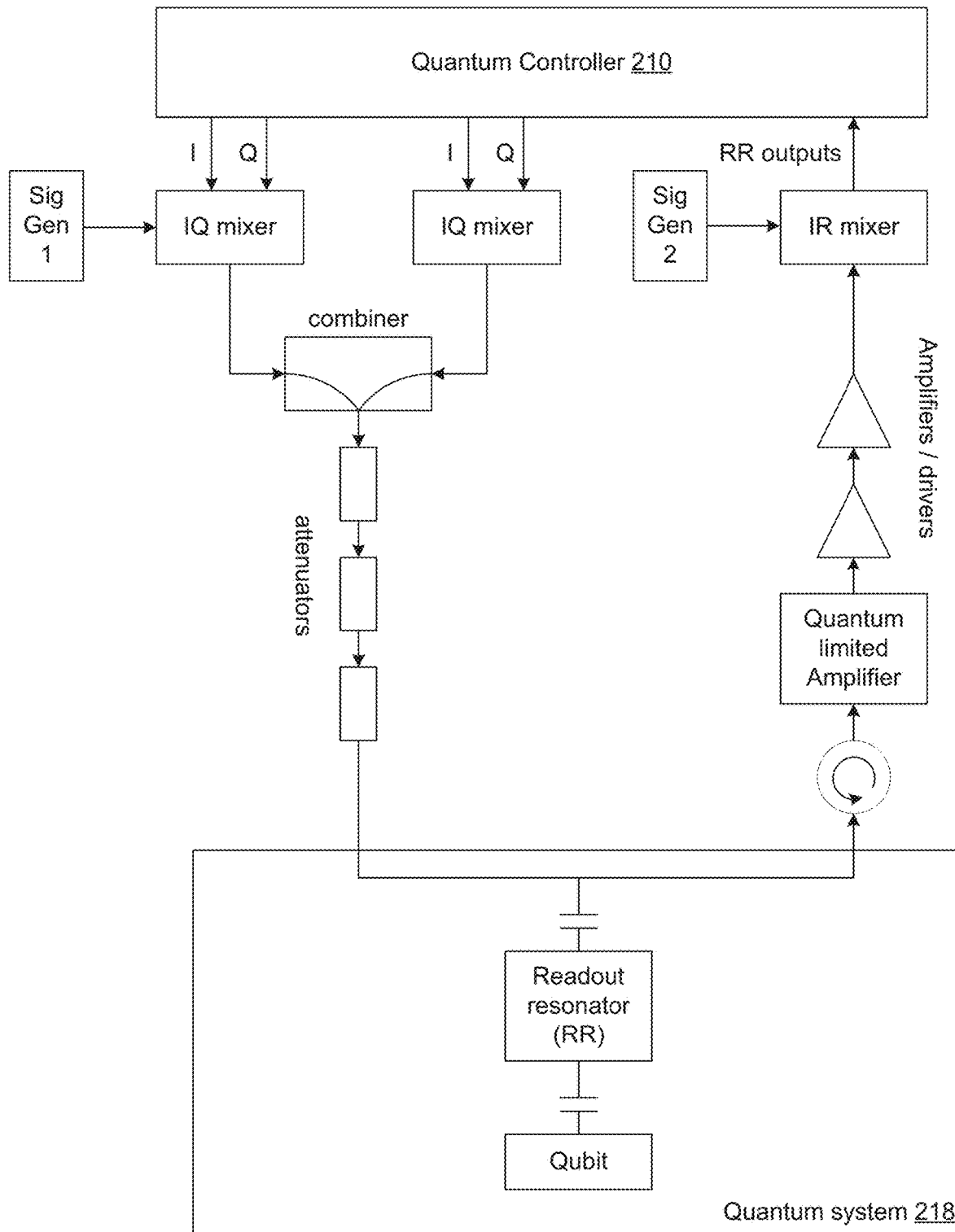
FIG. 7A shows a portion of a quantum machine configured to perform a Power Rabi calibration.

The example experiment setup is shown in FIG. 7A. The quantum device is a superconducting circuit composed of a single, fixed frequency qubit and a readout resonator, with the following Hamiltonian:

$$H = \frac{\hbar}{2}\omega_Q \sigma_Z + \hbar\omega_R a^\dagger a + \hbar g(a^{\dagger}\sigma^- + a\sigma^+).$$

Since the interaction between the qubit and resonator is dispersive ($|\omega_R - \omega_Q|$), an approximation can be made that leads to the following form of the Hamiltonian:

$$H \equiv \frac{\hbar}{2}\left(\omega_Q + \frac{g^2}{\Delta}\right)\sigma_Z + \hbar\left(\omega_R + \frac{g^2}{\Delta}\sigma_Z\right)a^\dagger a$$

Where $\Delta = \omega_Q - \omega_R$. Finally, the qubit driving term can be explicitly included, which leads to the Hamiltonian:

$$H = H_0 + \hbar s(t)\sigma_x + \frac{m(t)}{2}[a^\dagger e^{-i\omega_r t} + a e^{i\omega_r t}]$$

Here it is assumed that the frequencies of both the qubit and the resonator were calibrated in advance.

A signal, at the resonance frequency of the qubit, of the form $$s(t) = A\cos(\omega_Q t + \phi)$$

rotates the Bloch vector of the qubit at a rate A around the axis which is on the x-y plane and is rotated by an angle $\varphi$ from the x-axis.

If the parameters A(t) and $\varphi(t)$ are varied slowly compared to $\omega_Q$, then this still holds at each point in time. Thus, if a pulse is sent (i.e. a signal that is finite in time) to the qubit of the form $$s(t) = A(t)\cos(\omega_Q t + \phi)$$

where A(t) varies slowly compared to $\omega_Q$, the Bloch vector will be rotated around the above axis by a total angle which is given by the integral of A(t):

$$\theta = \int_{t_0}^{t_0+\tau} A(t)dt.$$

Here $t_0$ is the time at which the pulse starts and $\tau$ is the duration of the pulse.

In a typical Power Rabi Oscillations experiment, the shape and duration of the pulse A(t) are fixed (e.g. a 20-nanosecond Gaussian pulse) and only its amplitude is varied in order to get different rotation angles θ. The experiment performed by repeating the following basic sequence:
(1) Initialize the qubit to the ground state, 0.
(2) Apply a pulse with amplitude a (e.g. A(t) is a Gaussian shaped pulse with peak amplitude a, which rotates the qubit by θ so that the qubit is in the state $$\cos(\theta_a)|0\rangle + e^{i\phi}\sin(\theta_a)|1\rangle].$$

(3) Apply a resonant pulse to the readout resonator, and from the phase of the reflected pulse, deduce the state of the qubit.

Figure 7B:
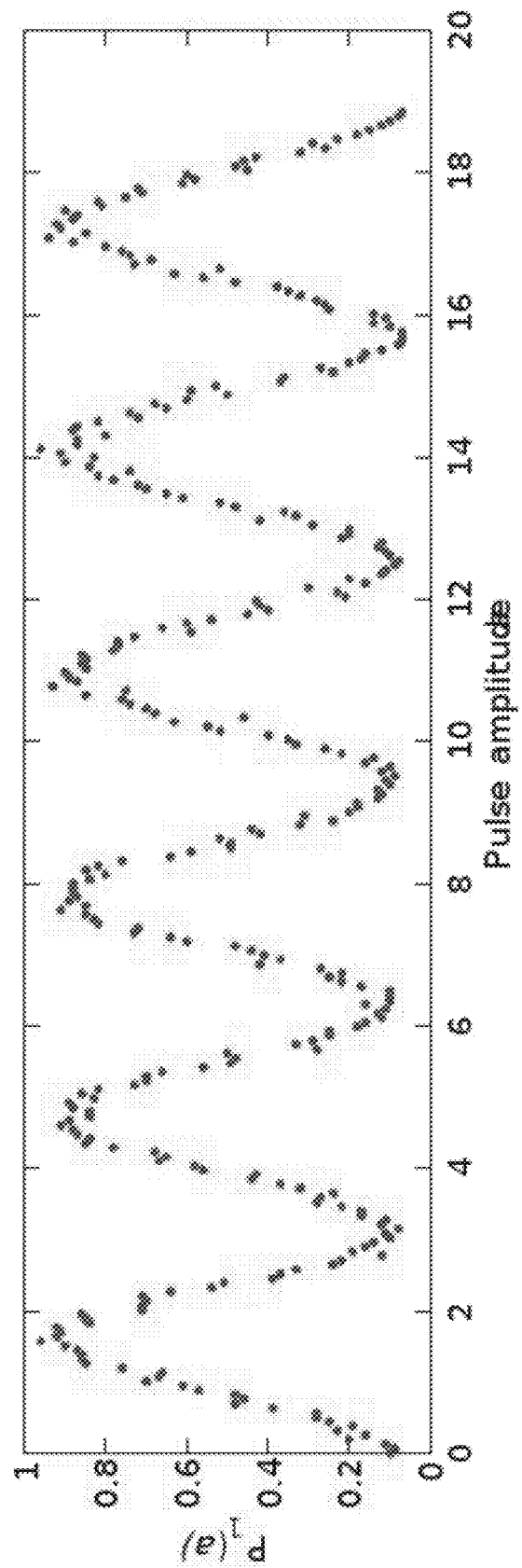
FIG. 7B shows the result of a Power Rabi calibration.

This basic sequence is repeated in the program for a series of amplitudes (i.e., many values of a), where for each amplitude, a, it is repeated N times (i.e. N identical basic sequences with the same a). N identical measurements are required because of state collapse. The measurement at the end of each basic sequence gives a binary result (0 or 1) for the state of the qubit, even if before the measurement the qubit was in a superposition state. However, when the results of the N identical basic sequences are averaged, the average will be $\sim\sin^2(\theta)$. Denote this average as $P_{|1\rangle}(a)$ since it reflects the probability of measuring the qubit in the |1⟩ state for a given amplitude, a. The results of the whole experiment can be summarized by plotting $P_{|1\rangle}(a)$ as a function of a (see FIG. 7B).

This can be used to calibrate any single qubit rotation gate that rotates the qubit by an angle θ, around a rotation axis that is on the x-y plane and is rotated φ from the x-axis. Such a gate is denoted by $R_{\phi(\theta)}$. In fact, one of the typical goals of the Power Rabi Oscillations experiment is to calibrate the amplitude of a given pulse so that it performs π-rotation (X-gate) or π/2-rotation. φ, however, cannot be determined from the Rabi oscillations and must be determined by other means (e.g. tomography).

An example implementation of the Power Rabi experiment in the QOP will now be described.

The experiment is implemented on the QOP as follows:
(1) Defining a quantum machine specification; (2) Opening an interface to the quantum machine; (3) Writing the program; (4) Running the program; (5) Saving the results.

As discussed above, the quantum machine specification is a description of the physical elements present in the experimental setup and their properties, as well as the connectivity between the elements and the quantum control module(s). The physical elements that are connected to the quantum control module(s) are denoted in the quantum machine specification as elements, which are discrete entities such as qubits, readout resonators, flux lines, gate electrodes, etc. Each of these has inputs and in some cases outputs, connected to the quantum control module(s). The properties of the elements and their connectivity to the quantum control module(s) are used by the QOP to interpret and execute QUA programs correctly (e.g. a pulse played to a certain qubit is modulated by the quantum control module with the intermediate frequency defined for this element). The quantum machine specification in FIGS. 5A-5C is used for this particular example.

The pulses applied to the elements are also specified in the quantum machine specification, where each pulse is defined as a collection of temporal waveforms. For example, a pulse to an element with two analog inputs and one digital input will specify the two waveforms applied to the analog inputs of the element and the digital pulse applied to its digital input.

Also defined in the quantum machine specification are the properties of any auxiliary components that affect the actual output of the controller, such as IQ mixers and local oscillators.

After defining the quantum machine specification, an interface to a new quantum machine can be opened with the following command:
>my_qm=qmManager.open_qm(my_config)

Code Snippet 2

After having defined the quantum machine specification, write the QUA program. The below code snippet 2 is the power Rabi program.

| Code Snippet 3 |
| --- |
| 1> with program( ) as powerRabiProg: |
| 2>   I = declare(fixed) |
| 3>   Q = declare(fixed) |
| 4>   a = declare(fixed) |
| 5>   Nrep = declare(int) |
| 6> with for_(Nrep, 0, Nrep < 100, Nrep + 1): |
| 7>   with for_(a, 0.00, a <= 1.0, a + 0.01): |
| 8>      play('gauss_pulse'*amp(a), 'qubit') |
| 9>      align("qubit", "RR") |
| 10>     measure('meas_pulse', 'RR', 'samples',('integW1',I), ('integW2',Q)) |
| 11>     save(I, 'I') |
| 12>     save(Q, 'Q') |
| 13>     save(a, 'a') |

The program is very intuitive to someone who knows the theory of the Power Rabi calibration, which illustrates one of the benefits of the QOP: the ability for people (e.g., quantum physicists) to rapidly design and run quantum experiments without first having to become expert programmers or computer systems designers. This is in stark contrast to current systems which, for example, require quantum physicists to learn a hardware description language such as VHDL or Verilog to be able to run their quantum experiments/algorithms.

This program: (1) Defines the QUA variables a (amplitude) and Nrep (number of repetitions), as well as the QUA variables I and Q, which store the demodulation result; and (2) Performs 100 repetitions (the loop over Nrep), where in each scan loops over 100 values of a, from 0-1 in increments of 0.01 and for each value of a performs the Rabi sequence: playing a pulse with amplitude a to the qubit, then measuring the resonator response and extracting from it the state of the qubit. This is done by sending a measurement pulse to the resonator and demodulating and integrating the returning pulse using the indicated integration weights.

The raw data sampled at the quantum control module's input is also streamed and saved with the label 'samples.' Finally, the demodulation and integration results, t and Q, are saved as well as the corresponding amplitude.

This PYTHON™ code block creates an object named powerRabiProg, which is a QUA program that can be executed on an open quantum machine.

The program is run on a quantum machine "my_qm" defined in the quantum machine specification using the following command which saves the results in the job object "my_job."
>my_job=my_qm.execute(powerRabiProg)

Code Snippet 4

After the program is executed, the results can be pulled:
>my_powerRabi_results=job.get_results( )

Code Snippet 5

This command pulls the results from "my_job" to the results object "my_powerRabi_results".

The data in "my_powerRabi_results" is a PYTHON™ object which contains the values saved during the program, as well as all the raw data sampled at the input of the quantum control module. Here, "my_powerRabi_results" will have: (1) my_powerRabi_results.variable_results, which will be a dictionary containing three keys: 'I', 'Q' and 'a'. The value for each key will be a dictionary containing the saved data and the time stamp for each saved data point; (2) my_powerRabi_results.raw_results, which will be a dictionary containing a single key and its value will be a dictionary containing the sampled input data and the time-stamp of each data point.

Stream Processing

Figure 8:
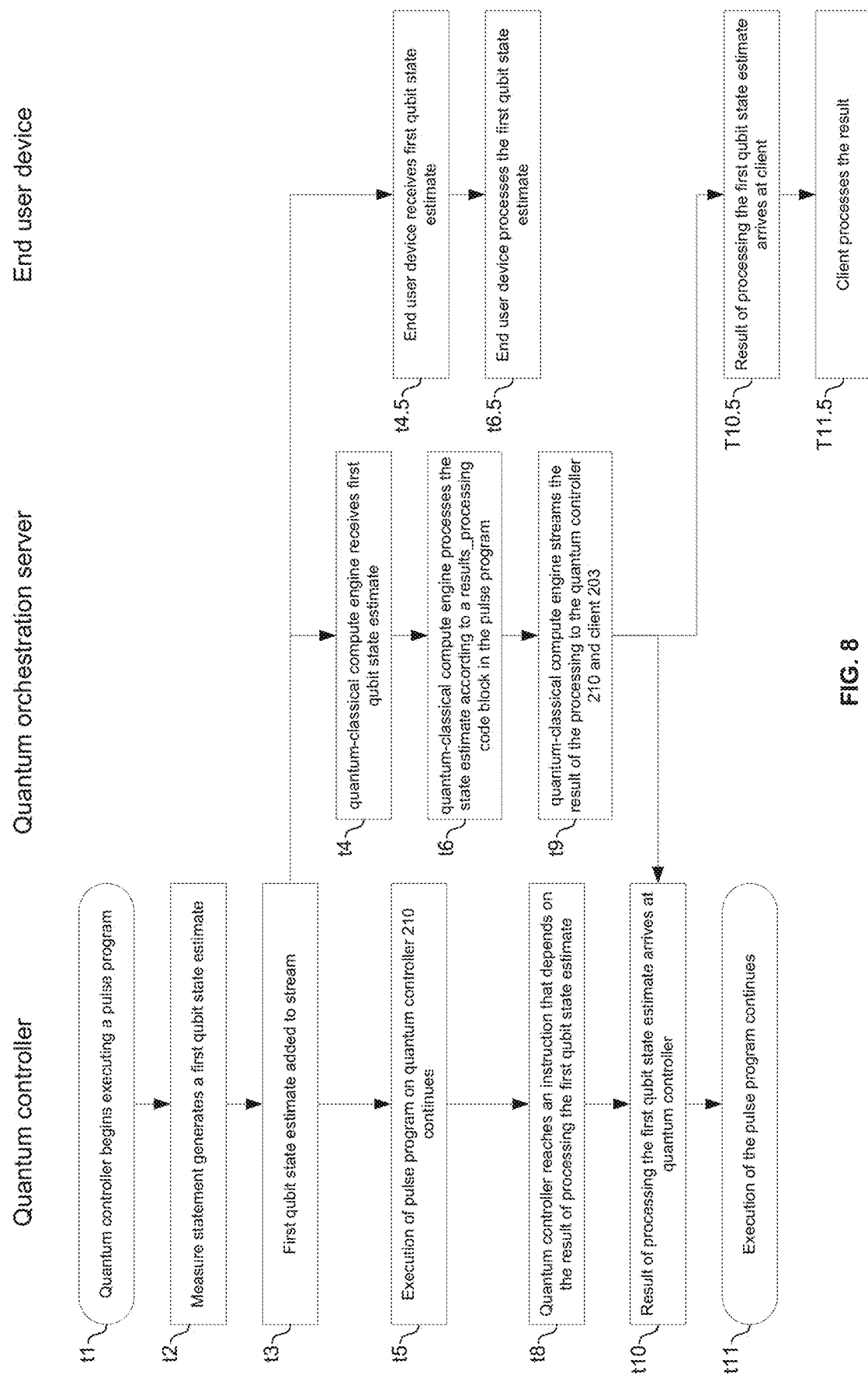
FIG. 8 shows a series of events taking place in the quantum controller and quantum-classical compute engine during execution of a pulse program.

FIG. 8 shows a series of events taking place in the quantum controller and quantum-classical compute engine during execution of a pulse program. In FIG. 8, the first column are events taking place on the quantum controller 210, the second column are events taking place on the quantum orchestration server 211, and the third column are events taking place on the end-user device_203. The processing on each of the three devices may be asynchronous with respect to the other devices. For example, t4, t6, and t9 may take place anytime after t3 and before t10; t4.5 and t6.5 may take place anytime after t3; and t10.5 and t11.5 may take place anytime after t9.

At time t1, the quantum controller 210 begins executing a pulse program.

At time t2, after time t1, a measure statement generates a first qubit state estimate.

At time t3, after time t2, the first qubit state estimation is streamed to the quantum-classical compute engine 213.

At time t5, after time t3, the quantum controller 210 continues executing the pulse program.

At time t8, after time t5, the quantum controller 210 reaches an instruction that depends on the result of the processing of the first qubit state estimate by the quantum-classical compute engine 213.

At time t10, after time t9, the result of the processing performed by the quantum-classical compute engine 213 arrives at the quantum controller 210.

At time t11, after time t10, execution of the pulse program resumes.

At time t4, after time t3 quantum classical compute engine 213 receives the first qubit state estimate.

At time t6, after time t4, the quantum-classical compute engine 213 processes the state estimate according to a results_processing code block in the pulse program being executed.

At time t9, after time t6, the quantum-classical compute engine 213 streams the result of the processing of the first qubit state estimate to the quantum controller 210 and to the end-user device_203.

At time t4.5, after time t3, end-user device_203 receives the first qubit state estimate.

At time t6.5, after time t4.5, the quantum-classical compute engine 213 processes the state estimate according to one or more classical programs/scripts loaded onto the end-user device_203. For example, a user may have created her own PYTHON™ program for processing the state estimate and that program may natively read a NumPy file in which the results were stored by the quantum orchestration server 211.

At time t10.5, after time t9, the result of the processing performed by the quantum-classical compute engine 213 arrives at the end-user device 203.

At time t11.5, after time t10.5, the end-user device_203 processes the processing result output by the quantum orchestration server 211 at time t9. For example, a user may have created her own PYTHON™ program for processing the result and that program may natively read a NumPy file in which the results were stored by the quantum orchestration server 211.

Thus, in the example scenario of FIG. 8, the quantum-classical compute engine 213 and the end-user device process the first qubit state estimate concurrently with the continued execution of the pulse program that generated the first qubit state estimate. Similarly, the quantum controller 210 and the end-user device_203 concurrently process/use the result of the quantum orchestration server 211 processing the qubit state estimate. In the scenario shown, the program needed the result before it was ready, and thus waited from t8 to t10 for the result. Of course, in another scenario, the processing of the first qubit state estimate by quantum-classical compute engine 213 could finish and the value be streamed to quantum controller 210 before time t8 in which case the pulse program would not experience any delay waiting on the result.

Stream Processing Examples

The following is an example QUA code snippet that takes advantage of the concurrent stream processing performed by the quantum-classical compute engine 213.

| Code Snippet 6 |
| --- |
| 1> f = declare(int) |
| 2> I = declare(fixed) |
| 3> Q = declare(fixed) |
| 4> RI = declare_stream(fixed) |
| 5> with for_(f, 40e6, f < 60e6, f+1e3) |
| 6>     update_frequency("RR", f) |
| 7>     measure ("long_readout_pulse", "RR", Rtrace) |
| 8>     save(I,RI) |

Lines 1 through 4 of the above snippet declare three QUA variables (f, I, and Q) and one QUA stream variable (RI). Because RI is a QUA stream variable, changes to the value of RI are events that get sent to the quantum orchestration server 211 in parallel with continued execution of the pulse program (e.g., referring briefly to FIG. 4, control circuitry 408 of the pulser 302$_I$ keeps track of the memory address at which the value of RI is stored, and when the value stored at that memory address changes, the value is output (possibly via an output buffer) to signal results$_I$ to the I/O manager 368, which, in turn, communicates the value (possibly via an output buffer) to the quantum orchestration server 211).

Referring back to the above QUA program snippet, lines 5 through 7 constitute a FOR loop that executes 20,000 times. In each iteration through the loop, the value of I is stored to the memory location referenced by RI. That is, there is an event on the stream RI after each iteration of the loop and thus the quantum orchestration server 211 receives the value of I at the end of each iteration of the loop. What the quantum orchestration server 211 does with those events can be specified in a results_processing code block.

The following is another example QUA code snippet that takes advantage of the concurrent stream processing performed by the quantum-classical compute engine 213.

Code Snippet 7

```
1>  qmManager = QuantumMachinesManager( )
2>  with program( ) as prog:
3>     A = declare(fixed)
4>     A_res = declare_stream(fixed)
5>     samples_res = declare_stream(int)
6>     measure('my_pulse', 'RR', samples_res)
7>     save(A, A_res)
8>     assign(A, 1.1)
9>     save(A, A_res)
10>    with stream_processing( ):
11>       A_res.save("A")
12>       A_res.save_all("A_all")
13>       G = A_res
14>       G.save("A_copy")
15>       samples_res.save_all("samples_from_res")
16>       H = A_res.average( )
17>       H.save_all("A_avg")
18> qm = qmManager.open_qm(config)
19> job = qm.execute(prog)
20> job.results.save_to_store( )
21> A_result = job.results.get("A")
22> A_result.pull( )
23> A_result.save_to_store( )
24> samples_result = job.results.samples_res
25> for item in samples_result:
26>    print(item)
27> job.results.samples_res.wait_for_values(count=500, timeout=5.2)
      .map(FUNCTION.AVG).save("res")
28> job.results.samples_res[10:50]
```

Line 1 creates a new instance of the QuantumMachinesManager class. Which then provides access to methods such as those described above in Table 3.

Line 2 opens a block of QUA source code which extends to line 16.

Line 3 declares a QUA variable, 'A', of type fixed.

Line 4 declares a QUA stream variable, 'A_res', of type fixed.

Line 5 declares a QUA stream variable, 'samples_res', of type int.

Line 6 calls the measure function to send the pulse 'my_pulse' (defined in a corresponding quantum machine specification) to the quantum element 'RR' (e.g., a readout resonator defined in a corresponding quantum machine specification) and to store the results (i.e., the raw values from the analog-to-digital converter that digitizes the values from readout resonator RR) in a memory location referenced by the QUA stream variable 'samples_res'.

Line 7 calls the save function to get the value from the memory location referenced by 'A' and store that value to a memory location referenced by 'A_res'. Because 'A_res' is a stream variable, this will trigger the reactive processing pipeline defined in the results_processing block.

Line 8 calls the assign function to store the value 1.1 to the memory location referenced by 'A'.

Line 9 calls the save function to get the value from the memory location referenced by 'A' (which is 1.1 because of the assign statement in line 8) and store that value to the memory location referenced by 'A_res'. Because 'A_res' is a stream variable, this will trigger the reactive processing pipeline defined in the results_processing block.

Line 10 begins a stream_processing( ) code block which defines a reactive pipeline to which all streams are sources. Each time one of the sources changes, the pipeline is triggered.

In line 11, in response to an event on 'A_res', the current value of 'A_res' is written to an "A" field of the results object (e.g., a NumPy object stored in the file system of the quantum orchestration server 211). Each time line 11 executes, the value of "A" in the results object is overwritten.

In line 12, in response to an event on 'A_res', the current value of 'A_res' is written to an "A_all" field of the results object (e.g., a NumPy object stored in the file system of the quantum orchestration server 211). Each time line 12 executes, the value of 'A_res' is appended to the "A_all" field of the results object.

In line 13, G is assigned to 'A_res', thus making 'G' an additional reference to the memory location referenced by 'A_res'.

In line 14, in response to an event on 'G', the current value of 'G' is written to an "A_copy" field of the results object (e.g., a NumPy object stored in the file system of the quantum orchestration server 211) Each time line 14 executes, the value of "A_copy" in the results object is overwritten.

In line 15, in response to an event on 'samples_res', the current value of 'samples_res' is written to a "samples_from_res" field of the results object (e.g., a NumPy object stored in the file system of the quantum orchestration server 211). Each time line 15 executes, the value of 'samples_res' is appended to the "samples_from_res" field of the results object.

In line 16 a new QUA stream variable 'H' is declared and is set equal to the running average of 'A_res'.

In line 17, in response to an event on 'H' (which in turn corresponds to an event on 'A_res') the value of 'H' is appended to an "A_avg" field of the results object. Line 17 is the last line of the results processing block.

In line 18, a new quantum machine, referenced by variable 'qm', is opened.

In line 19, the program in lines 2 through 17 is executed on the open quantum machine 'qm' and the result is referenced by variable 'job,'

In line 20, the results object generated by execution of program 'prog' is saved to a file store (e.g., storage of the end-user device 203).

In line 21, 'A_result' is set as a reference to the "A" field of the results object.

In line 22, the pull( ) method provides access to the current value of 'A_result'.

In line 23, the value of 'A_result' is saved to a file store (e.g., storage of the end-user device 203).

In line 24, 'samples_result' is set as a reference to the "samples_res" field of the results object.

Lines 25 and 26 define a for loop which iteratively prints each item of 'samples_res'.

Line 27 instructs to wait up to 5.2 seconds for 500 values of 'samples_res' and then calculate an average of the 500 values and save the average to a "res" field of the results object.

Line 28 gets the $10^{th}$ through $50^{th}$ values of 'samples_res'.

In accordance with an example implementation of this disclosure, circuitry of a pulse generation program compiler (e.g., 207 executing on hardware of the quantum orchestration server 211) is operable to parse pulse generation program source code (e.g., 264) comprising a declaration of a non-stream variable (e.g., line 3 of Code Snippet 7, above), a declaration of a stream variable (e.g., line 4 of Code Snippet 7, above), and one or more stream processing statements (e.g., lines 10-17 of code snippet 7, above) that reference the stream variable. The circuitry of the pulse generation program compiler is operable to generate, based on the declaration of the non-stream variable, machine code that, if executed by a quantum controller (e.g., 210), will configure the quantum controller to allocate a first memory address (e.g., in memory of pulser $302_I$) for storing a value assigned to the non-stream variable. The circuitry of the pulse generation program compiler is operable to generate, based on the declaration of the stream variable, machine code that, if executed by the quantum controller, will configure the quantum controller to allocate a second memory address (e.g., in memory of pulser $302_I$) for storing a value assigned to the stream variable. The circuitry of the pulse generation program compiler is operable to generate, based on the one or more stream processing statements, machine code that, if executed by the quantum controller, will configure the quantum controller to output, upon detection of an update of contents of the second memory address, the contents of the second memory address via an output port of the quantum controller (e.g., via I/O manager 368). The circuitry of the pulse generation program compiler is operable to generate, based on the one or more stream processing statements, machine code that, if executed by the quantum orchestration server (e.g., 211), will configure the quantum orchestration server to receive the contents of the second memory address via the output port of the quantum controller (e.g., via an Ethernet or other LAN connection between the quantum orchestration server and the quantum controller). The circuitry of the pulse generation program compiler may be operable to generate, based on the one or more stream processing statements, machine code that, if executed by the quantum orchestration server, will configure the quantum orchestration server to perform a classical computation involving the contents of the second memory address received from the quantum controller. The classical computation may comprise calculating an average of the contents of the second memory address received from the quantum controller and previous contents of the second memory address received from the quantum controller. The circuitry of the pulse generation program compiler may be operable to generate, based on the one or more stream processing statements, machine code that, if executed by the quantum orchestration server, will configure the quantum orchestration server to calculate a value based on the contents of the second memory address received from the quantum controller; and write the value to the first memory address referenced by the non-stream variable. The pulse generation program source code may comprise a conditional expression that depends on the non-stream variable, and the circuitry of the pulse generation program compiler may be operable to generate, based on the statement, machine code that, if executed by the quantum controller, will configure the quantum controller to: wait for the write of the value to the first memory address; and, in response to the write of the value of the first memory address, evaluate the conditional expression based on the value of the first memory address. The circuitry of the pulse generation program compiler may be operable to generate, based on the conditional expression, machine code that, if executed by the quantum controller, will configure the quantum controller to: generate a first quantum control pulse having a first one or more characteristics if the conditional expression evaluates to true; and generate a second quantum control pulse having a second one or more characteristics if the conditional expression evaluates to false (e.g., execute a first play instruction if the expression evaluates to true and execute a second play instruction if the expression evaluates to false). The circuitry of the pulse generation program compiler is operable to generate, based on the conditional expression, machine code that, if executed by the quantum controller, will configure the quantum controller to: execute a first one or more instructions of the pulse generation program if the conditional expression evaluates to false; and execute a second one or more instructions of the pulse generation program if the conditional expression evaluates to true. The pulse generation source code may comprise one or more statements for determining the state of a quantum element and the circuitry of the pulse generation program compiler may be operable to generate, in response to the one or more statements for determining the state of a quantum element, machine code that, if executed by the quantum controller, will configure the quantum controller to; perform a classical computation on samples of a return pulse from the quantum element; and perform the update of the contents of the second memory address based on a result of the classical computation.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processors (e.g., x86, x64, ARM, PIC, and/or any other suitable processor architecture) and associated supporting circuitry (e.g., storage, DRAM, FLASH, bus interface circuits, etc.). Each discrete ASIC, FPGA, processor, or other circuit may be referred to as a "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
   parsing, by circuitry of a pulse generation program compiler, pulse generation program source code comprising a declaration of a non-stream variable, a declaration of a stream variable, and one or more stream processing statements that reference the stream variable, wherein the stream variable references an object returned by a function call;
   generating, by the circuitry of the pulse generation program compiler based on the declaration of the non-stream variable, machine code that, if executed by a quantum controller, will configure the quantum controller to allocate a first memory address for storing a value assigned to the non-stream variable;
   generating, by the circuitry of the pulse generation program compiler based on the declaration of the stream variable, machine code that, if executed by the quantum controller, will configure the quantum controller to allocate a second memory address for storing a value assigned to the stream variable;
   generating, by the circuitry of the pulse generation program compiler based on the one or more stream processing statements, machine code that, if executed by the quantum controller, will configure the quantum controller to output, upon detection of an update of contents of the second memory address, the contents of the second memory address via an output port of the quantum controller; and
   generating, by the circuitry of the pulse generation program compiler based on the one or more stream processing statements, machine code that, if executed by a quantum orchestration server, will configure the quantum orchestration server to receive the contents of the second memory address via the output port of the quantum controller.

2. The method of claim 1, comprising:
   generating, by the circuitry of the pulse generation program compiler based on the one or more stream processing statements, machine code that, if executed by the quantum orchestration server, will configure the quantum orchestration server to:
   perform a classical computation involving the contents of the second memory address received from the quantum controller.

3. The method of claim 2, wherein the classical computation comprises calculating an average of the contents of the second memory address received from the quantum controller and previous contents of the second memory address received from the quantum controller.

4. The method of claim 2, comprising:
   generating, by the circuitry of the pulse generation program compiler based on the one or more stream processing statements, machine code that, if executed by the quantum orchestration server, will configure the quantum orchestration server to:
   calculate a value based on the contents of the second memory address received from the quantum controller; and
   write the value to the first memory address referenced by the non-stream variable.

5. The method of claim 4, wherein the pulse generation program source code comprises a conditional expression that depends on the non-stream variable, and the method comprises:
   generating, by the circuitry of the pulse generation program compiler based on the conditional expression, machine code that, if executed by the quantum controller, will configure the quantum controller to:
   wait for the write of the value to the first memory address; and
   in response to the write of the value of the first memory address, evaluate the conditional expression based on the value of the first memory address.

6. The method of claim 5, comprising:
   generating, by the circuitry of the pulse generation program compiler based on the conditional expression, machine code that, if executed by the quantum controller, will configure the quantum controller to:
   generate a first quantum control pulse having a first one or more characteristics if the conditional expression evaluates to true; and
   generate a second quantum control pulse having a second one or more characteristics if the conditional expression evaluates to false.

7. The method of claim 5, comprising:
   generating, by the circuitry of the pulse generation program compiler based on the conditional expression, machine code that, if executed by the quantum controller, will configure the quantum controller to:
   execute a first one or more instructions of the pulse generation program if the conditional expression evaluates to false; and
   execute a second one or more instructions of the pulse generation program if the conditional expression evaluates to true.

8. The method of claim 4, wherein the pulse generation program source code comprises a pulse generation statement that depends on the non-stream variable, and the method comprises:
generating, by the circuitry of the pulse generation program compiler based on the pulse generation statement, machine code that, if executed by the quantum controller, will configure the quantum controller to:
generate a pulse having a characteristic determined based on the value written to the first memory address.

9. The method of claim 1, wherein the pulse generation program source code comprises one or more statements for determining a state of a quantum element and the method comprises:
generating, by the circuitry of the pulse generation program compiler based on the one or more statements for determining the state of a quantum element, machine code that, if executed by the quantum controller, will configure the quantum controller to:
perform a classical computation on samples of a return pulse from the quantum element; and
perform the update of the contents of the second memory address based on a result of the classical computation.

10. A system comprising:
circuitry of a quantum controller operable to:
execute instructions of a pulse generation program; and
perform, per the instructions of the pulse generation program during the execution of the instructions of the pulse generation program:
allocation of a first memory address for storage of a value assigned to a non-stream variable;
allocation of a second memory address for storage of a value assigned to a stream variable, wherein the stream variable references an object returned by a function call; and
output of contents of the second memory address via an output port of the quantum controller; and
quantum orchestration server circuitry operable to:
execute instructions of the pulse generation program;
perform, per the instructions of the pulse generation program during execution of the instructions of the pulse generation program:
reception of the contents of the second memory address via the output port of the quantum controller.

11. The system of claim 10, wherein the quantum orchestration server circuitry is operable to perform, per the instructions of the pulse generation program during execution of the instructions, a classical computation involving the contents of the second memory address received from the quantum controller.

12. The system of claim 11, wherein the classical computation comprises calculation of an average of the contents of the second memory address received from the quantum controller and previous contents of the second memory address received from the quantum controller.

13. The system of claim 11, wherein the quantum orchestration server circuitry is operable to, per the instructions of the pulse generation program during the execution of the instructions of the pulse generation program:
calculate a value based on the contents of the second memory address received from the quantum controller; and
write the value to the first memory address referenced by the non-stream variable.

14. The system of claim 13, wherein the circuitry of the quantum controller is operable to, per the instructions of the pulse generation program during the execution of the pulse generation program:
wait for the write of the value to the first memory address; and
in response to the write of the value of the first memory address, evaluate a conditional expression based on the value of the first memory address.

15. The system of claim 14, wherein the circuitry of the quantum controller is operable to, per the instructions of the pulse generation program during the execution of the pulse generation program:
generate a first quantum control pulse having a first one or more characteristics if the conditional expression evaluates to true; and
generate a second quantum control pulse having a second one or more characteristics if the conditional expression evaluates to false.

16. The system of claim 14, wherein the circuitry of the quantum controller is operable to, per the instructions of the pulse generation program during the execution of the pulse generation program:
execute a first one or more of the instructions of the pulse generation program if the conditional expression evaluates to false; and
execute a second one or more instructions of the pulse generation program if the conditional expression evaluates to true.

17. The system of claim 13, wherein the circuitry of the quantum controller is operable to, per the instructions of the pulse generation program during the execution of the pulse generation program, generate a pulse having a characteristic determined by the value written to the first memory address.

18. The system of claim 10, wherein the circuitry of the quantum controller is operable to, per the instructions of the pulse generation program during the execution of the pulse generation program:
perform a classical computation on samples of a return pulse from a quantum element; and
perform an update of the contents of the second memory address based on a result of the classical computation.

19. A system comprising:
one or more non-transitory machine-readable media having stored thereon:
one or more instructions of a pulse generation program that, when executed by circuitry of a quantum controller, cause the circuitry of the quantum controller to:
allocate, during execution of the one or more instructions, a first memory address for storing a value assigned to a non-stream variable;
allocate a second memory address for storing a value assigned to a stream variable, wherein the stream variable references an object returned by a function call; and
output, upon detection of an update of contents of the second memory address, the contents of the second memory address via an output port of the quantum controller; and
one or more instructions that, when executed by circuitry of a quantum orchestration server, cause the quantum orchestration server to:
receive the contents of the second memory address via the output port of the quantum controller.

20. The system of claim 19, wherein the one or more non-transitory machine-readable media have stored thereon one or more instructions that, when executed by the circuitry of the quantum orchestration server, cause the quantum orchestration server to perform a classical computation involving the contents of the second memory address received from the quantum controller.

21. The system of claim 20, wherein the classical computation comprises calculation of an average of the contents of the second memory address received from the quantum controller and previous contents of the second memory address received from the quantum controller.

22. The system of claim 20, wherein the one or more non-transitory machine-readable media have stored thereon one or more instructions that, when executed by the circuitry of the quantum orchestration server, cause the quantum orchestration server to:
    calculate a value based on the contents of the second memory address received from the quantum controller; and
    write the value to the first memory address referenced by the non-stream variable.

23. The system of claim 22, wherein the one or more non-transitory machine-readable media have stored thereon one or more instructions that include a conditional expression that depends on the non-stream variable, and that, when executed by circuitry of a quantum controller, cause the quantum controller to:
    wait for the write of the value to the first memory address; and
    in response to the write of the value of the first memory address, evaluate the conditional expression based on the value of the first memory address.

24. The system of claim 23, wherein the one or more non-transitory machine-readable media have stored thereon one or more instructions that, when executed by circuitry of a quantum controller, cause the quantum controller to:
    generate a first quantum control pulse having a first one or more characteristics if the conditional expression evaluates to true; and
    generate a second quantum control pulse having a second one or more characteristics if the conditional expression evaluates to false.

25. The system of claim 23, wherein the one or more non-transitory machine-readable media have stored thereon one or more instructions that, when executed by circuitry of a quantum controller, cause the quantum controller to:
    execute a first one or more instructions of the pulse generation program if the conditional expression evaluates to false; and
    execute a second one or more instructions of the pulse generation program if the conditional expression evaluates to true.

26. The system of claim 22, wherein the one or more non-transitory machine-readable media have stored thereon one or more instructions that include a pulse generation statement that depends on the non-stream variable, and that, when executed by circuitry of a quantum controller, cause the quantum controller to:
    generate a pulse having a characteristic determined by the value written to the first memory address.

27. The system of claim 19, wherein the one or more non-transitory machine-readable media have stored thereon one or more instructions that, when executed by circuitry of a quantum controller, cause the quantum controller to:
    perform a classical computation on samples of a return pulse from a quantum element; and
    perform the update of the contents of the second memory address based on a result of the classical computation.

* * * * *